(12) United States Patent
Krishnamurthy et al.

(10) Patent No.: US 12,038,230 B2
(45) Date of Patent: Jul. 16, 2024

(54) CHILLER, AIR SEPARATION SYSTEM, AND RELATED METHODS

(71) Applicant: Air Products and Chemicals, Inc., Allentown, PA (US)

(72) Inventors: Gowri Krishnamurthy, Sellersville, PA (US); Nasim Ul Hassan Malik, London (GB); Qiao Zhao, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 703 days.

(21) Appl. No.: 17/036,439

(22) Filed: Sep. 29, 2020

(65) Prior Publication Data

US 2022/0099367 A1   Mar. 31, 2022

(51) Int. Cl.
*F25J 3/04* (2006.01)

(52) U.S. Cl.
CPC ....... *F25J 3/04157* (2013.01); *F25J 3/04187* (2013.01); *F25J 3/04242* (2013.01);
(Continued)

(58) Field of Classification Search
CPC .. F25J 3/04618; F25J 3/04278; F25J 3/04018; F25J 3/04242; F25J 3/04539;
(Continued)

(56) References Cited

U.S. PATENT DOCUMENTS 4,367,082 A * 1/1983 Tomisaka ............. F25J 3/04181
  62/650
4,907,405 A   3/1990 Polizzotto
(Continued)

FOREIGN PATENT DOCUMENTS

CN   202254635 U   5/2012
CN   210346385 U   4/2020
(Continued)

OTHER PUBLICATIONS

Porreca, Luca et al.; Effect of inlet cooling on the performances of isothermal main air compressors used in ASU applications; Asia Turbomachinery & Pump Symposium; Feb. 22-25, 2016; Texas A&M Engineering Experiment Station; 14 pgs.
(Continued)

*Primary Examiner* — John F Pettitt, III
*Assistant Examiner* — Webeshet Mengesha
(74) *Attorney, Agent, or Firm* — Matthew R. Weaver

(57) ABSTRACT

A chiller can be configured as a chiller for a gasification system or other type of system or plant. In some embodiments, the chiller can be configured to utilize a single heat source, such as low grade waste heat in the form of hot water, and/or low pressure steam to drive one or more absorption-based chillers to cool inlet air to one or more adsorbers of a pre-purification unit (PPU). In the event of the detection of an undesired impurity spike (e.g. carbon dioxide spike, etc.) an additional amount of heat source can be withdrawn from the gasification system to increase the level of cooling the absorption chiller can provide to improve the removal of impurities. An automated control loop can be utilized in some embodiments. The control loop can be configured to check for an impurity concentration and adjust operations accordingly.

20 Claims, 7 Drawing Sheets

(52) U.S. Cl.
CPC ........ *F25J 3/04775* (2013.01); *F25J 2205/32* (2013.01); *F25J 2210/60* (2013.01); *F25J 2230/30* (2013.01); *F25J 2230/40* (2013.01)

(58) Field of Classification Search
CPC .... F25J 3/0545; F25J 3/04957; F25J 3/04563; F25J 3/04775; F25J 2205/50; F25J 2205/60; F25J 2270/906; F25J 1/0225; F25B 15/00
See application file for complete search history.

(56) References Cited

U.S. PATENT DOCUMENTS

| | | | |
|---|---|---|---|
| 5,323,616 | A | 6/1994 | Chretien et al. |
| 7,497,092 | B2 * | 3/2009 | Le Bot ................ F25J 3/04157 62/643 |
| 8,980,204 | B2 | 3/2015 | Krishnamurthy et al. |
| 2003/0140653 | A1 * | 7/2003 | Fuentes ................ F25J 3/04581 62/643 |
| 2010/0275648 | A1 | 11/2010 | Mazumder et al. |
| 2014/0077133 | A1 | 3/2014 | Krishnamurthy et al. |

FOREIGN PATENT DOCUMENTS

| | | |
|---|---|---|
| CN | 111426148 A | 7/2020 |
| EP | 1010954 A1 | 6/2000 |
| EP | 2010846 A2 | 7/2009 |
| FR | 2919920 A1 | 2/2009 |
| JP | H052303346 A | 8/1993 |
| JP | 2014006036 A2 | 1/2014 |
| KR | 20010067037 A | 7/2001 |
| WO | 2004065869 A1 | 8/2004 |
| WO | 2017105191 A1 | 6/2017 |

OTHER PUBLICATIONS

Wilson K.B. et al:"Air Purification for Cryogenic Air Separation Units", IOMA Brodcaster, International Oxygen Manufacturers Association, Cleveland, OH, US, Jan. 1, 1984 pp. 15-20.

* cited by examiner

CHILLER, AIR SEPARATION SYSTEM, AND RELATED METHODS

FIELD OF THE INVENTION

The present innovation relates to chillers, absorption chillers, air separation plants, air separation systems, systems utilizing chillers and/or absorption chillers and methods of making and using the same.

BACKGROUND OF THE INVENTION

Gasification is a process for the conversion of a carbonaceous feedstock such as coal, petroleum, biofuel, biomass, etc. into a combustible gas, such as synthesis gas. Examples of gasification processes can be appreciated from U.S. Pat. No. 8,980,204 and U.S. Pat. App. Pub. No. 2014/0077133.

Synthesis gas, commonly referred to as syngas, is a mixture of varying amounts of carbon monoxide (CO) and hydrogen (H2) and has a variety of applications. The syngas can be used to generate power by combusting directly in a gas turbine, boiler or reciprocating engine, by feeding into a fuel cell, and/or waste heat can be used in the generation of steam which can provide additional power through a steam turbine. Syngas can also be used for the production of hydrogen or liquid fuels or chemicals, gaseous fuels, synthetic natural gas, and/or carbon monoxide, some of which may be used as raw materials in the manufacture of other chemicals such as ammonia, plastics, etc.

Depending on the feedstock used, the syngas produced may include CO, H2, steam (H2O), hydrogen cyanide (HCN), carbon dioxide (CO2), nitrogen (N2,), oxygen (O2), methane (CH4), hydrogen sulfide (H2S), carbonyl sulfide (COS), ammonia (NH3, hydrochloric acid (HCl), argon (Ar), mercury (Hg), hydrocarbons, heavy hydrocarbons such as tars, particulates comprising char, ash, and/or unconverted fuel.

The syngas can be produced at high temperature and may first be cooled using dry and wet quenching using water. This step can also reduce the particulate content in the syngas. The syngas is cooled and hot water, steam, or a waste heat flow of fluid (e.g. a flow of flue gas generated via combustion, etc.) are typically produced. The cooled syngas can then often be cooled in multiple steps, including acid gas (CO2, SO2) removal, mercury guard beds, COS/H2S removal, HCl, ammonia removal, etc. The product syngas is then typically sent for downstream processing or for power generation. Multiple hot streams can be present in the gasification section, such as turbine waste heat, hot water, steam at a variety of pressures (e.g. low pressure (LP) steam at 5-12 bar, which is 500 kPa to 1,200 kPa, moderate pressure (MP) steam at 10-20 bar, which is 1,000 kPa to 2,000 kPa, and high pressure (HP) steam at 15-50 bar, which is 1,500 kPa to 5,000 kPa).

Chillers have been used in conjunction with gasification systems. Examples of chillers can be appreciated from U.S. Pat. No. 4,907,405, U.S. Pat. App. Pub. No. 2010/0275648, International Publication No. WO 2004/065869 and Chinese Utility Model No. CN 210346385 U. Such chillers can have a high power demand and are often not environmentally friendly or sustainable.

SUMMARY

Gasification can be a high temperature, high pressure process that may produce a limited amount of CO2 and other gases that may be vented to the atmosphere external to a plant. Acid gases such as CO2 and SO2 may be either vented or sent to storage, sold as by-product, or converted to acids for sale as by-product in some situations. However, during maintenance, mal-operation, purging, off-design operation, etc. small amounts of CO2, NO2, hydrocarbons, and other impurities may be vented to the atmosphere for short periods of time. We have determined that a solution is needed to address problems that can arise from such venting.

For example, we have determined that, the location of an air separation unit (ASU) for a gasification plant can be selected to be sufficiently far away from the vent stack or upstream from a typical wind direction. However, when wind speed or direction changes, we determined that the vent stack exhaust can impact the dispersion of CO2 in the air around the ASU feed intake, which can affect the concentration of CO2 in the feed air introduced to the ASU. As a result of this increase in CO2 concentration, the feed air that is fed to the ASU may have a significantly higher CO2 concentration and/or hydrocarbon load. We have determined that these impurities can be efficiently removed from the feed air prior to it being sent to one or more chillers (e.g. a cold box), while still producing a desired amount of 02 product from the ASU.

In some cases, the CO2 content in the feed air may vary from 400 ppm (normal) to about 800 ppm, or to about 1500 ppm, or about 2000 ppm, or greater than 2000 ppm for a short period of time. The period of time may vary from less than 1 hour to multiple days in rare situations. We have also determined that there can also be other types of impurity concentration spikes (e.g. CO content in the feed air being above a pre-selected threshold, a hydrocarbon content in the feed air, a combination of CO2 content, and CO content in the feed air, a combination of CO2 content, CO content, and hydrocarbon content in the feed air being above a pre-selected threshold, etc.) that can detrimentally affect operations in addition to CO2 spikes. We have determined that the ASU can be better designed to handle these impurity "spikes" efficiently for gasification systems.

One solution to address this issue that we thought of may be to adjust the height of the vent stacks or to have them face in the opposite direction of the ASU. However, such solutions may only work for short spikes. Further, practical issues such as the wind direction, etc. can lead to contamination of the inlet air to the ASU.

Most gasification facilities tend to be large and can have a high oxygen demand. Such facilities can require a large pre-purification unit (PPU). In some cases, multiple trains of PPUs may be needed. Multiple trains and vessels can increase the capital cost, operating cost, as well as footprint, layout, and complexity of a plant. At the high capacities, the thermal swing adsorbers of a PPU that may be utilized would also have to be significantly larger. As they become larger, capital costs, manufacturing complexity, shipping and transportation costs and limitations also increase. We determined that another challenge for improving gasification facilities is to permit thermal swing adsorption (TSA) vessels of a PPU to be smaller while also accounting for the impurity content increases in ASU feed intake that can occur.

A third challenge in some gasification facilities that we identified is that regeneration gas (also referred to as "regen gas') that can be passed through an adsorber to regenerate the adsorbent material therein (e.g. typically waste N2,), may not be readily available. For instance, we determined that waste N2 is often balanced between feed air and product O2 and product N2. There may be insufficient waste N2 available as regen gas when most N2 is produced as product or used to produce a product, such as in ammonia production, for example. The quantity of required regen gas can be heavily impacted by the amount of water that may need to be removed from the adsorbent material of one or more adsorbers of an ASU. For instance, the amount of water in the feed air can increase with an increase in ambient temperature. The quantity of the available waste N2 may be insufficient to regenerate the PPU under hot ambient conditions.

We believe an improved gasification system can address at least one of these problems we have identified. Most preferably, an embodiment is designed to provide a solution that can address all three of these challenges at low capital cost, low operating cost, high efficiency, flexibility over ambient temperature and concentration changes, low footprint, and ease in operability is of particular desirability to address the problems we have determined to exist in conventional systems. Embodiments can also preferably provide a solution that is sustainable and environmentally friendly.

Embodiments of our chiller, absorption based chilling system, plant, and air separation unit can be configured to address one or more of the problems in gasification facilities that we have identified by using a heat source, such as low grade waste heat in the form of hot water, and/or low pressure steam which may be available in the gasification section of a plant to help drive one or more absorption-based chillers to cool the inlet air to the adsorber(s) of a PPU, which can allow the one or more adsorbers to be smaller in size and reduce the regen gas requirement since less adsorbate may need to be desorbed. In the event of CO2 spikes or other type of impurity concentration spike (e.g. NOx spike, CO spike, lighter hydrocarbons spikes (e.g. methane (CH4) spike), etc.), additional heat source can be withdrawn from the gasification system to increase the level of cooling of the absorption chiller system (and/or one or more chillers) to improve the removal of impurities to address the impurity spike that may occur during operation of the plant.

In some embodiments, an automated control loop can be included that is configured to check for CO2 in the feed and adjust the feed temperature accordingly. If a higher heat transfer efficiency is desired for some embodiments, then multiple cooling stages may be used (multiple effect versus single effect chillers). This can be especially helpful when the cooling that may be required is relatively high, such as over 10° C.

We determined that, at colder temperatures, the adsorbers of the PPU can be sized to be smaller because of lower water content and improved adsorption capacity of other impurities. For instance, we determined that for every 1° C. drop in feed temperature for some embodiments, about a 10% reduction in water load can be obtained. Adsorption isotherms can also be improved at lower temperatures. This can allow heavy hydrocarbons to get knocked out with the water before the air is fed to a PPU so that other impurities can be removed at higher efficiency in the adsorber(s) of the PPU. This can enable the one or more of the PPU's adsorbers to be smaller, be more efficient, have a lower footprint, and be simpler in design (e.g. utilize less layers of adsorbent material).

In the event CO2 spikes or other type of undesired impurity concentration spike occur in the feed composition, embodiments of the system can be designed to increase the heat source sent to the absorption chiller as one or more streams of heated fluid (e.g. steam, flue gas, etc.) to permit the heat from the stream(s) to drive absorption chiller operation for cooling the feed gas (either directly via the evaporator of an absorption chiller or indirectly by chilling a cooling medium of a direct contact cooler or a cooling medium fed to a different type of heat exchanger). In some embodiments of the chiller and adsorption based chilling system can be utilized to provide improvement until the feed temperature is close to freezing (e.g. at ~5° C.). The chilling system can also be utilized to address other types of undesirable content concentration spikes (e.g. a spike in an impurity in addition to or as an alternative to CO2) or other type of spike of a fluid property (e.g. an unexpected spike in temperature, etc.). In some embodiments, the absorption chiller system and/or chiller can be designed for the coldest possible feed temperature and highest heat source flow. This type of configuration can often allow for an increased flexibility in operation at a minimal cost.

The degree of chilling that can be provided may also be adjusted for feed temperature. For instance, during summer months, a higher amount of chilling may be used, versus in the winter months when a lower amount of chilling may be used.

Having a cold feed temperature to the PPU not only allows adsorbers of the PPU to be smaller but can also reduce the machine power of the ASU. The presence of a pump and heat exchangers of one or more absorption chillers instead of compressors (rotating equipment) of one or more mechanical chillers can improve the reliability and availability of the absorption chillers.

We determined that there is an unexpected benefit that can be obtained by use of embodiments of our chiller, chiller absorption system, absorption based chilling system, and methods of making and using the same as these embodiments can be configured to address multiple problems in gasification facilities by leveraging heat sources that can be available in gasification plants and converting them to cool air to provide improved performance while also addressing feed intake impurity issues that can arise during operations. Additionally, embodiments can be configured so that adsorbers of the PPU can be designed to be single layer (e.g. molecular sieve only), which can eliminate the need for the alumina adsorbent layer entirely in some embodiments as water can be removed upstream of the PPU via at least one knockout drum or other water removal mechanism that can be positioned downstream of the at least one absorption chiller and/or absorption based chilling system. Hydrocarbons or other impurities may also be removable upstream of the PPU as well (e.g. also via the knockout drum, for example). We have determined that this can be provided in some embodiments because water and hydrocarbons can be predominantly removed by partial condensation upstream of the PPU and downstream of the one or more absorption chillers or the absorption based chilling system.

Embodiments of our chiller, absorption chiller and absorption based chilling system, and plant can have a significantly low power cost due to the power source being free and therefore reduce operating cost significantly and improve sustainability. For instance, embodiments can be configured to use water as the refrigerant and, as a result, can be more environmentally friendly than mechanical chillers that use chlorofluorocarbons (CFCs) as a refrigerant.

Some embodiments of our chilling system can be configured as an absorption based chilling system for an air separation unit (ASU) of a plant. The absorption based chilling system can include at least one absorption chiller positioned to receive at least one process stream from a gasification section of the plant so heat from the at least one process steam is fed to at least one generator of the at least one absorption chiller. The at least one absorption chiller can be positionable to: (i) cool air at a first pressure from a compression system of the ASU for feeding the cooled air to a pre-purification unit (PPU) for purification of the air to form a purified air flow for feeding the purified air flow to a cold box of the ASU, (ii) cool the purified air flow from the PPU before the purified air flow is fed to the cold box, and/or (iii) cool air at a second pressure from the compression system of the ASU for feeding the cooled air at the second pressure to the compression system to undergo further compression to the first pressure (the first pressure being higher than the second pressure).

It should be appreciated that the absorption based chilling system can be arranged and configured so that the at least one absorption chiller is positionable to perform only one of the options (i)-(iii), only two of the options (i)-(iii) (e.g. options (i) and (ii), options (ii) and (iii) or options (i) and (iii), etc.), or all three of these options (i)-(iii). The at least one absorption chiller can also be positioned to provide additional cooling of other plant process flows in some embodiments.

In some embodiments, at least one evaporator of the at least one absorption chiller can cool the air at the first pressure received from the compression system of the ASU for feeding the cooled air to the PPU, cool the purified air flow from the PPU before the purified air flow is fed to the cold box, and/or cool the air at the second pressure from the compression system.

Some embodiments of the absorption based chilling system can also include direct contact cooler. The direct contact cooler can be integrated into an aftercooler or can be separate and downstream from an aftercooler in embodiments that may utilize an aftercooler. The direct contact cooler can be positioned to receive the air at the first pressure from the compression system of the ASU for cooling the air and feeding the cooled air to the PPU via a cooling medium. The direct contact cooler can be connected to the at least one absorption chiller to receive the cooling medium from the absorption chiller for cooling the air at the first pressure. The cooling medium can be water or glycol in some embodiments, The PPU can include at least one radial adsorber or at least two radial adsorbers in some embodiments. In some embodiments, the direct contact cooler cooling medium can include water and the absorption based chilling system can also include a cooling tower positioned between the cold box and the at least one absorption chiller to cool the cooling medium before the cooling medium is fed to the at last one absorption chiller. The cooling tower can be positioned to receive a flow of cooling fluid from the cold box to cool the cooling medium before the cooling medium is fed to the at least one absorption chiller.

The absorption based chilling system can be configured to detect an impurity concentration of the air. The impurity concentration can be, for example, a concentration of CO2, a concentration of CO, a concentration of NOx, a concentration of one or more light hydrocarbons (e.g. CH4, etc.) or a combination of these impurities at different concentration thresholds. Embodiments of the system can also be configured so that the at least one absorption chiller includes a primary absorption chiller and a secondary absorption chiller. In such embodiments, the system can be arranged and configured so that one of:
(i) the absorption based chilling system is configured so that a first portion of the air at the first pressure from the compression system is fed to the primary absorption chiller for chilling and a second portion of the air at the first pressure from the compression system is fed to the secondary absorption chiller for chilling in response to the impurity concentration being at or above a pre-selected threshold, and
(ii) the absorption based chilling system is configured so that a first portion of a cooling medium to be fed to a direct contact cooler for cooling the air at the first pressure from the compression system is fed to the primary absorption chiller to cool the first portion of the cooling medium to a pre-selected direct contact cooler chilling medium inlet temperature and a second portion of the cooling medium to be fed to the direct contact cooler for cooling the air at the first pressure is fed to the secondary absorption chiller to cool the second portion of the cooling medium to the pre-selected direct contact cooler chilling medium inlet temperature in response to the impurity concentration being at or above a pre-selected threshold.

In other embodiments, the absorption based chilling system can be configured so that the absorption based chilling system is configured so that the air at the first pressure from the compression system is fed to the primary absorption chiller for chilling. In other embodiments, the absorption based chilling system can be configured so that a cooling medium to be fed to a direct contact cooler for cooling the air at the first pressure from the compression system is fed to the primary absorption chiller to cool the cooling medium to a pre-selected direct contact cooler chilling medium inlet temperature. In some embodiments, the direct contact cooler can be integrated into an aftercooler or be positioned downstream of the aftercooler.

A plant is also provided. The plant can include an ASU that has an embodiment of our absorption based chilling system and the gasification section. In some embodiments of the plant, the ASU can have the compression system, the cold box, and the PPU and at least one knockout drum positioned between the absorption based chilling system and the cold box. In some embodiments of the plant, the at least one process stream from the gasification section of the plant can also heat a heater for heating regeneration fluid feedable to at least one adsorber of the PPU in an off-state position during operation of the plant for heating a regeneration fluid passed through the at least one adsorber for regeneration of adsorbent material within the at least one adsorber. For instance, steam of another relatively hot process stream from the gasification section can be utilized for heating the regeneration fluid.

A method of cooling air in an air separation unit (ASU) of a plant that has a gasification section is also provided. Embodiments of the method can include positioning at least one absorption chiller in the ASU to receive at least one process stream from the gasification section so heat from the at least one process steam from the gasification section is feedable to at least one generator of the at least one absorption chiller. The at least one absorption chiller can provide cooling to facilitate:
(i) cooling air at a first pressure from a compression system of the ASU for feeding the cooled air to a pre-purification unit (PPU) for purification of the air to form a purified air flow for feeding the purified air flow to a cold box of the ASU,
(ii) cooling the purified air flow from the PPU before the purified air flow is fed to the cold box, and/or
(iii) cooling air at a second pressure from the compression system of the ASU for feeding the cooled air at the second pressure to the compression system to undergo further compression to the first pressure, the first pressure being higher than the second pressure.

It should be appreciated that the cooling facilitated via the at least one absorption chiller can include only one of options (i)-(iii), all three of options (i)-(iii) or only two of these options (e.g. just options (i)-(ii), just options (ii)-(iii), or just options (i) and (iii), etc.). In yet other embodiments, the at least one absorption chiller can provide cooling for other process streams as well.

In some embodiments of the method, at least one evaporator of the at least one absorption chiller can cool the air at the first pressure received from the compression system of the ASU for feeding the cooled air to the PPU, cool the purified air flow from the PPU before the purified air flow is fed to the cold box, and/or cool the air at the second pressure from the compression system.

It should be appreciated that a direct contact cooler can be positioned to receive the air at the first pressure from the compression system of the ASU for cooling the air and feeding the cooled air to the PPU via a cooling medium in embodiments of the method. The direct contact cooler can be connected to the at least one absorption chiller to receive the cooling medium from the at least one absorption chiller for cooling the air at the first pressure. The providing cooling via the at least one absorption chiller to facilitate cooling air at the first pressure from the compression system of the ASU for feeding the cooled air to the PPU for purification of the air to form the purified air flow for feeding the purified air flow to the cold box of the ASU can include the at least one absorption chiller cooling the cooling medium to a pre-selected direct contact cooler chilling medium inlet temperature for feeding the cooling medium at the pre-selected direct contact cooler chilling medium inlet temperature to the direct contact cooler. In some of these embodiments of the method, the direct contact cooler can be downstream of an aftercooler arranged between a compression system and the direct contact cooler or can be integrated into the aftercooler.

In some embodiments of the method, the at least one absorption chiller can include a primary absorption chiller and a secondary absorption chiller. The method can also include detecting an impurity concentration level that is at or above a pre-selected threshold. The impurity concentration can be, for example, a concentration of $CO_2$, a concentration of CO, a concentration of NOx, a concentration of one or more light hydrocarbons (e.g. $CH_4$, etc.) or a combination of these impurity concentrations at different concentration thresholds. Embodiments of the method can also include one of:

(a) in response to determining that an impurity concentration level is at or above a pre-selected threshold, adjusting operations so that a first portion of the air at the first pressure from the compression system is fed to the primary absorption chiller and a second portion of the air at the first pressure from the compression system is fed to the secondary absorption chiller, and (b) in response to determining that an impurity concentration level is at or above a pre-selected threshold, adjusting operations so that a first portion of a cooling medium to be fed to a direct contact cooler for cooling the air at the first pressure from the compression system is fed to the primary absorption chiller to cool the first portion of the cooling medium to a pre-selected direct contact cooler chilling medium inlet temperature and a second portion of the cooling medium to be fed to the direct contact cooler for cooling the air at the first pressure from the compression system is fed to the secondary absorption chiller to cool the second portion of the cooling medium to the pre-selected direct contact cooler chilling medium inlet temperature.

Embodiments of the method can also include other steps. For instance, the method can also include utilizing the at least one process stream from the gasification section to heat regeneration fluid to feed the heated regeneration fluid to an adsorber of the PPU that is in an off-state position for regeneration of adsorbent material within the adsorber of the PPU that is in the off-state position. The off-state adsorber of the PPU can be a radial adsorber in some embodiments. In some embodiments, the PPU can include at least one radial adsorber or at least two radial adsorbers (e.g. one radial adsorber that can be in an on-state for purification and a second radial adsorber that can be in an off-state position while the other adsorber is in the on-state position for regeneration of the adsorbent material of the off-state adsorber).

We also provide embodiments of a chilling system for an air separation unit (ASU) of a plant. The chilling system can include a first chiller and a second chiller. The first and second chillers can be absorption chillers or can be other types of chillers (e.g. mechanical chillers). The first chiller can be positioned to facilitate: (i) cooling air at a first pressure from a compression system of the ASU for feeding the cooled air to a pre-purification unit (PPU) for purification of the air to form a purified air flow for feeding the purified air flow to a cold box of the ASU, (ii) cooling the purified air flow from the PPU before the purified air flow is fed to the cold box, and/or (iii) cooling air at a second pressure from the compression system of the ASU for feeding the cooled air at the second pressure to the compression system to undergo further compression to the first pressure (the first pressure being higher than the second pressure). The chilling system can include a computer device configured to detect an impurity concentration of the air. The impurity concentration can be, for example, a concentration of $CO_2$, a concentration of CO, a concentration of NOx, a concentration of one or more light hydrocarbons (e.g. $CH_4$, etc.) or a combination of these impurities at different concentration thresholds in some embodiments.

In some embodiments, the chilling system can be configured so that a first portion of the air at the first pressure from the compression system is fed to the first chiller for chilling and a second portion of the air at the first pressure from the compression system is fed to the second chiller for chilling in response to the impurity concentration being at or above a pre-selected threshold. In other embodiments, the chilling system can be configured so that a first portion of a cooling medium to be fed to a direct contact cooler for cooling the air at the first pressure from the compression system is fed to the first chiller to cool the first portion of the cooling medium to a pre-selected direct contact cooler chilling medium inlet temperature and a second portion of the cooling medium to be fed to the direct contact cooler for cooling the air at the first pressure is fed to the second chiller to cool the second portion of the cooling medium to the pre-selected direct contact cooler chilling medium inlet temperature in response to the impurity concentration being at or above a pre-selected threshold.

Other details, objects, and advantages of our chillers, absorption chillers, absorption based chilling systems, systems utilizing one or more chillers, plants utilizing one or more chillers, and methods of making and using the same will become apparent as the following description of certain exemplary embodiments thereof proceeds.

BRIEF DESCRIPTION OF THE DRAWINGS

Exemplary embodiments of chillers, absorption chillers, absorption based chilling systems, systems utilizing one or more chillers, plants utilizing one or more chillers, and methods of making and using the same are shown in the drawings included herewith. It should be understood that like reference characters used in the drawings may identify like components.

DETAILED DESCRIPTION

Figure 1:
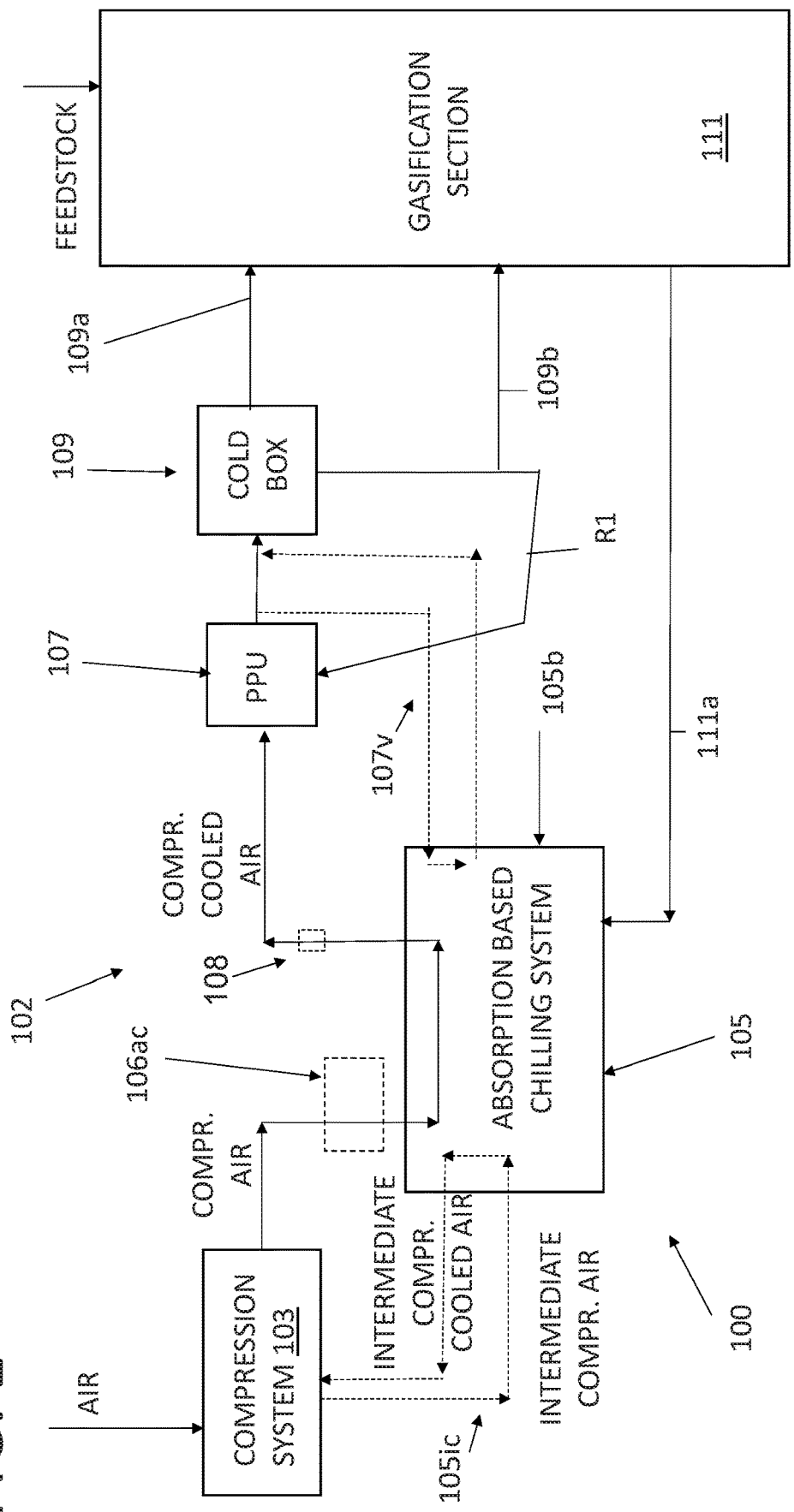
FIG. 1 is a schematic block diagram of a first exemplary embodiment of a plant utilizing a first exemplary embodiment of the absorption based chilling system. An intermediate compressor air cooling conduit arrangement 105ic, a knockout drum 108, and an arrangement of conduits for a purified cooling stream flow 107v that can be utilized in this embodiment is shown in broken line in FIG. 1.

Referring to FIGS. 1-7, a plant 100 can be configured to include a cryogenic air distillation system for generation of one or more output flows for providing one or more desired products (e.g. oxygen gas, nitrogen gas, argon gas, etc.). In other embodiments, the plant can be configured to process other fluid to generate one or more other desired product flows. The plant 100 can include an air separation unit (ASU) 102 and a gasification section 111. The ASU can include a compression system 103 that has at least one compressor to compress a feed air flow (AIR) so that compressed air output from the compression system 103 is compressed to a compression system output pressure (COMPR. AIR), a pre-purification unit 107 for purifying the compressed air output from the compressor, and a cold box 109 for cooling the purified compressed air and separating oxygen (O2) and nitrogen (N2) from the compressed air and outputting the oxygen and the nitrogen flows as first and second output flows 109a and 109b. The cold box 109 can also liquefy and/or otherwise separate other components of the purified air it received from the PPU 107 to form output flows to other gases, such as argon gas, for example. These output flows can be fed to the gasification section 111 of the plant 100. In some embodiments, at least portions of these output flows from the cold box 109 can also be utilized to form products (e.g. oxygen gas, nitrogen gas, ammonia, argon gas, or other gas products). At least a portion of the nitrogen output from the cold box can also be fed to an off-line adsorber of the PPU 107 as a PPU regeneration flow R1 of a regeneration stream R output from the cold box 109 for regeneration of adsorbent material while an online adsorber of the PPU is purifying the compressed air. A cooling system such as an absorption based chilling system 105 or other type of chilling system 105 can be positioned between the compression system 103 and the PPU 107 to help facilitate the cooling of compressed air (COMPR. AIR) from the compression system 103 so that cooled compressed air (COMPR. COOLED AIR) can be fed to the PPU 107.

The PPU 107 can be configured to purify the compressed air to remove carbon dioxide (CO2), water, nitrous oxide (N2O), heavy hydrocarbons, and/or other impurities that could either freeze out or cause safety issues in a downstream process. If impurities are not sufficiently removed from the compressed air, they could disrupt normal operation, cause damage to coldbox equipment, require shutdowns and costly maintenance work, impact equipment life, and/or impact the safety of the ASU. For efficient operation of the gasification section 111, the ASU 102 can be designed to minimize maintenance and turndowns so that the PPU can operate at a high efficiency for the life of the facility.

The gasification section 111 can utilize one or more feedstocks (e.g. coal, oil, natural gas, bio oil, etc.) to gasify that feedstock in a gasifier. Syngas created via the gasification of the feedstock(s) can be cooled in at least one syngas cooling unit and purified in at least one syngas purification unit. The purified syngas can then be utilized in a power plant for generation of electricity to power one or more elements of the plant, be utilized for chemical synthesis and/or be utilized in some other plant process(es). In the gasification process and subsequent cooling and purification of the syngas, the gasification section 111 can produce at least one heated process stream 111a such as steam, hot water, or waste heat from at least one flow of fluid generated via a gasification section unit (e.g. heat from flue gas generated from combustion in the gasifier, etc.). At least one heated process stream 111a from the gasification section can be passed to an absorption based chilling system 105 for cooling of the compressed air output from a compressor 103 so that heat from one or more gasification section process streams 111a is able to be utilized in one or more absorption chillers 105b of the absorption based chilling system 105. A gasification section to chilling system conduit arrangement can be positioned between the gasification section and the absorption based chilling system 105 for routing the heated process stream(s) 111a to at least one absorption chiller 105b of the absorption based chilling system 105 (which can also be referred to as an absorption-based chilling system). The absorption based chilling system 105 can also be positioned in the plant for cooling purified air output from the PPU 107 for cooling that flow of purified air before it is fed to the cold box 109. This positioning of the absorption based chilling system 105 for cooling the output of the PPU 107 can be in addition to or as an alternative from cooling the compressed air (e.g. COMPR. AIR and/or INTERMEDIATE COMPR. AIR) from the compression system 103 via a purified cooling stream flow 107v connecting at least one absorption chiller 105b of the absorption chilling system 105 between the PPU 107 and the cold box 109.

The absorption based chilling system 105 can also be connected to at least one intermediate stage of the compression system 103 for cooling air (INTERMEDIATE COMPR.

AIR) that is compressed to at least one intermediate pressure (e.g. an first intermediate pressure, a second intermediate pressure, a low compressed air pressure, etc.) before the cooled compressed air is fed back to the compression system 103 as an intermediate compressed cooled air flow (INTERMEDIATE COMPR. COOLED AIR) to undergo further compression via the compression system 103 to a compression system output pressure (e.g. a pressure that is higher than the one or more intermediate pressures that can be at or within a pre-selected compressed air pressure range for the output of the compression system 103).

In some embodiments, the compression system 103 can include a compressor that has multiple compression stages (e.g. two stages, three stages, four stages, more than two stages, etc.). The output pressure for the compressed air output from the final stage of the compression system 103 (COMPR. AIR) can be at a pressure in the range of 5-50 bar for many embodiments (e.g. 50 bar, in a range of 5-20 bar, in a range of 5-10 bar, 5 bar, etc.). One or more intermediate pressures at one or more different intermediate stages of the compressed air (INTERMEDIATE COMPR. AIR) can each be at a pressure that is below this output pressure. The compressed air output flow (COMPR. AIR) at the output pressure can be routed from the compression system 103 to the absorption based chilling system 105 for cooling before the compressed air is then fed to PPU 107.

In some embodiments, there may be multiple intermediate stage compression air flows that can be fed to the absorption based chilling system 105 for cooling. For instance, compressed air output from a particular intermediate stage can be routed to the absorption based chilling system 105 for cooling before that cooled compressed air is then returned to the compression system 103 to undergo further compression in a subsequent stage of the compression system.

For example, for a compression system 103 that has three stages (e.g. a first stage, a second stage, and a third stage), compressed air that is output from the first stage of compression at a first intermediate pressure can be fed to the absorption based cooling system 105 as a first intermediate compressed air flow (INTERMEDIATE COMPR. AIR) for chilling. The chilled first intermediate compressed air flow can then be output from the absorption based chilling system 105 to the second stage of the compression system 103 to undergo further compression. After the compressed air is further compressed to a second pressure that his higher than the first pressure via the second stage of the compression system, the compressed air can be output from the second stage of the compression system and routed as a second intermediate compressed air flow (INTERMEDIATE COMPR. AIR) to the absorption based chilling system 105 for cooling. The cooled second intermediate compressed air flow can then be routed back to the compression system 103 for being fed to the third stage of the compression system to undergo further compression to an output pressure that is higher than the first intermediate pressure and is also higher than the second intermediate pressure of the intermediate compressed air flows output from the earlier compression system stages. The compressed air output from the third stage can be an output compressed air flow (COMPR. AIR) that is at an output pressure in the range of 5-50 bar as discussed above.

It should be appreciated that the intermediate pressures of the compressed air output form intermediate stages of a compressor is less than the final output pressure for the final stage of the compression system. These intermediate output pressures can range from greater than 1 bar to less than 50 bar (e.g. be a pressure in a range of greater than 1 bar to less than 5 bar, be a pressure in a range of greater than 1 bar to less than 10 bar, be a pressure in a range of greater than 1 bar to less than 20 bar, etc.).

As indicated in broken line in FIGS. 1-4 and as can be appreciated from the above, there can be at least one intermediate compressed air conduit arrangement 105$ic$ connected between the compression system 103 and the absorption chilling system 105 for connecting the compression system 103 to the absorption chilling system 105 so intermediate pressure air from the compression system can be cooled via at least one absorption chiller 105$b$ and then have the cooled compressed gas routed back to the compression system 103 to undergo further compression. For example, compressed air from an intermediate stage of a compressor can be fed to the absorption chilling system 105 for cooling and the cooled gas can then be fed back to another stage of the compressor for further compression. As another example, compressed air from a first stage of a compressor of the compression system 103 can be fed to the absorption chilling system 105 and the cooled compressed air can then be fed to a second stage of the compressor of the compression system 103 via at least one intermediate compressed air conduit 105$ic$ to undergo further compression so air compressed to a pre-selected air feed pressure can be output from the compressions system as a compressed air flow.

For instance, there can be a first intermediate compressed air conduit arrangement 105$ic1$ for feeding compressed air that is at an intermediate pressure to a first absorption chiller 105$b$ for cooling and having that cooled air fed back to the compressions system 103 to undergo additional compression. In embodiments in which a second absorption chiller 105$b$ may be provided (e.g. embodiments where two or more absorption chillers may operate in parallel or series or where a second chiller may operate as a secondary chiller for selective use in response to one or more secondary chiller actuation conditions being met), there can also be a second intermediate compressed air conduit arrangement 105$ic2$ for feeding compressed air that is at an intermediate pressure from the compression system 103 to a second absorption chiller 105$b$ for cooling and having that cooled air fed back to the compressions system to undergo additional compression.

As can be appreciated from the above, embodiments that utilize a compressor having multiple stages can include conduit arrangements so that compressed air at one or more intermediate pressures can be output from the non-final stages of the compressor so that each intermediate compressed air pressure flow can be fed to the absorption chiller 105$b$ for cooling via at least one intermediate compressed air conduit arrangement 105$ic1$ and/or 105$ic2$ for that intermediate compressed air flow to be cooled before it is fed to the next compressor stage to undergo further compression.

The absorption based chilling system 105 can include at least one absorption chiller 105$b$. Each absorption chiller 105$b$ can be a single stage chiller or a multiple stage chiller. In some embodiments, the absorption based chilling system 105 can include at least two absorption chillers 105$b$ that can include a primary absorption chiller 105$c$ and a secondary absorption chiller 105$d$. The secondary absorption chiller 105$d$ can be configured to operate in parallel or in series with the primary absorption chiller 105$b$ when it is utilized. In yet other embodiments there can be more than two chillers that operate in parallel or series (e.g. three chillers, four chillers, etc.).

Figure 4:
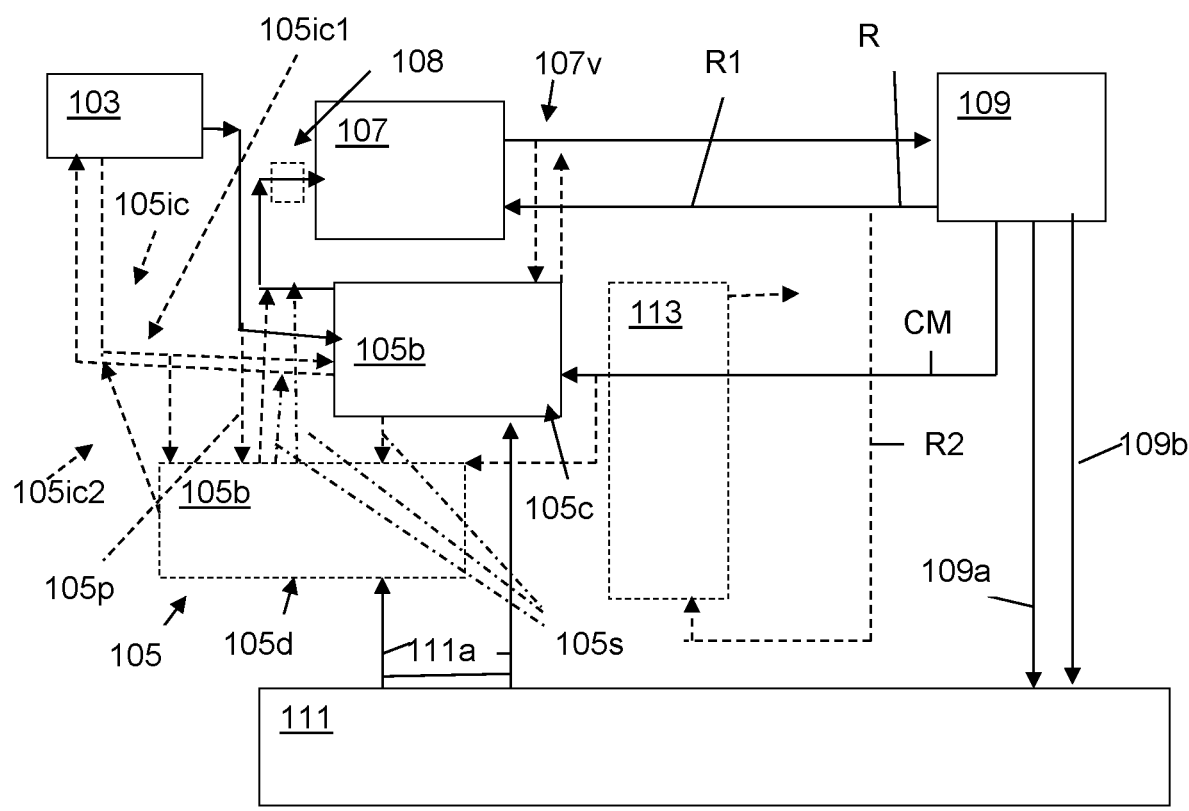
FIG. 4 is a fragmentary schematic block diagram of the first exemplary embodiment of the plant that provides a more detailed illustration of an exemplary fluid flow for fluid passing to and from the exemplary absorption based chilling system.
Figure 5:
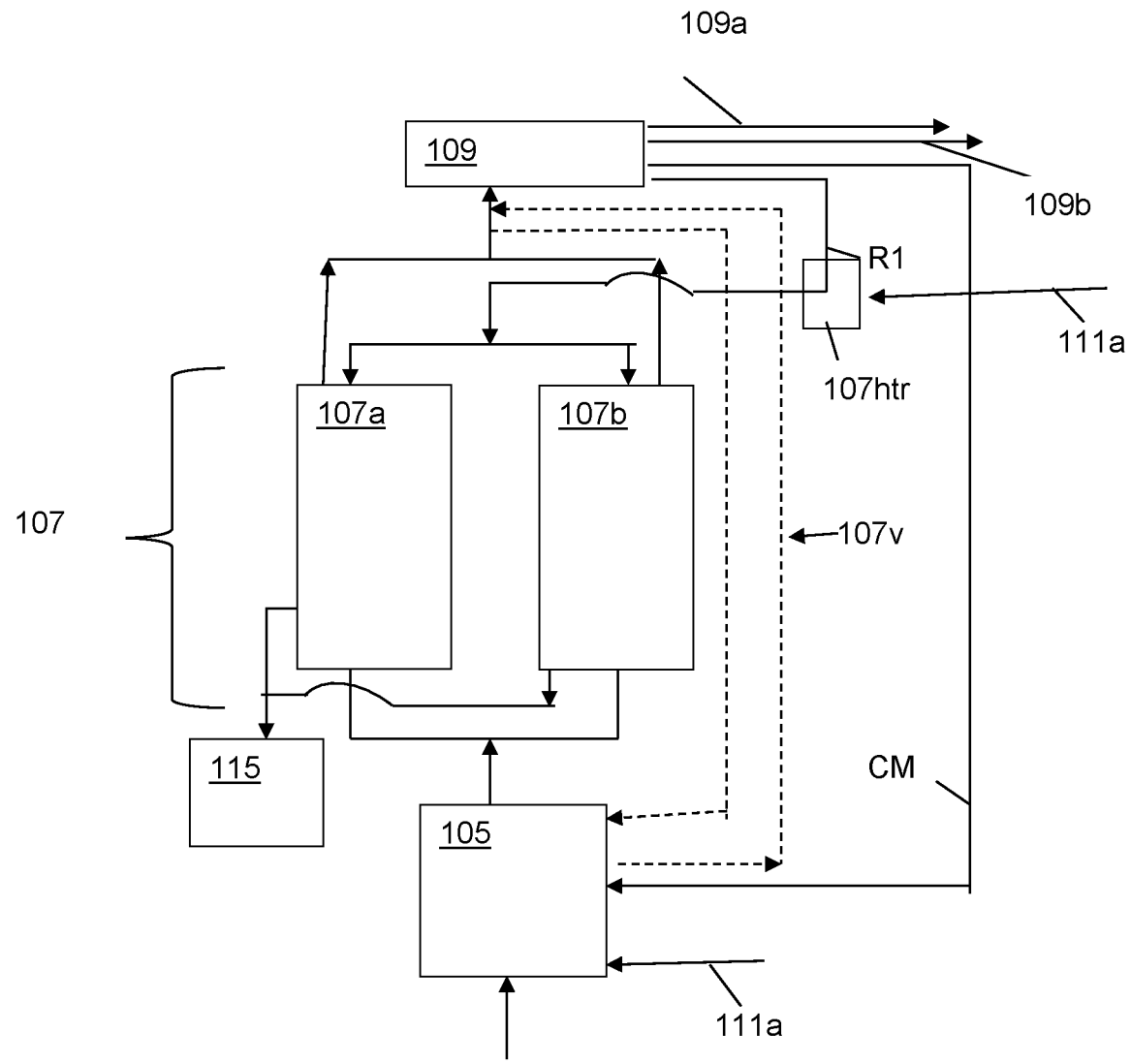
FIG. 5 is a schematic block diagram of the exemplary PPU arrangement of the first and second exemplary embodiments of the plant.

The absorption based chilling system 105 can be positioned and configured so that compressed air output from the compression system (COMPR. AIR) is fed to an optional aftercooler 106ac (shown in broken line in FIGS. 1 and 2) using cooling water before being sent to the at least one absorption chiller 105b for chilling the compressed air before the cooled compressed air (COMPR. COOLED AIR) is fed to the PPU 107. FIGS. 1 and 4 may best illustrate an exemplary embodiment of this type of arrangement.

Figure 2:
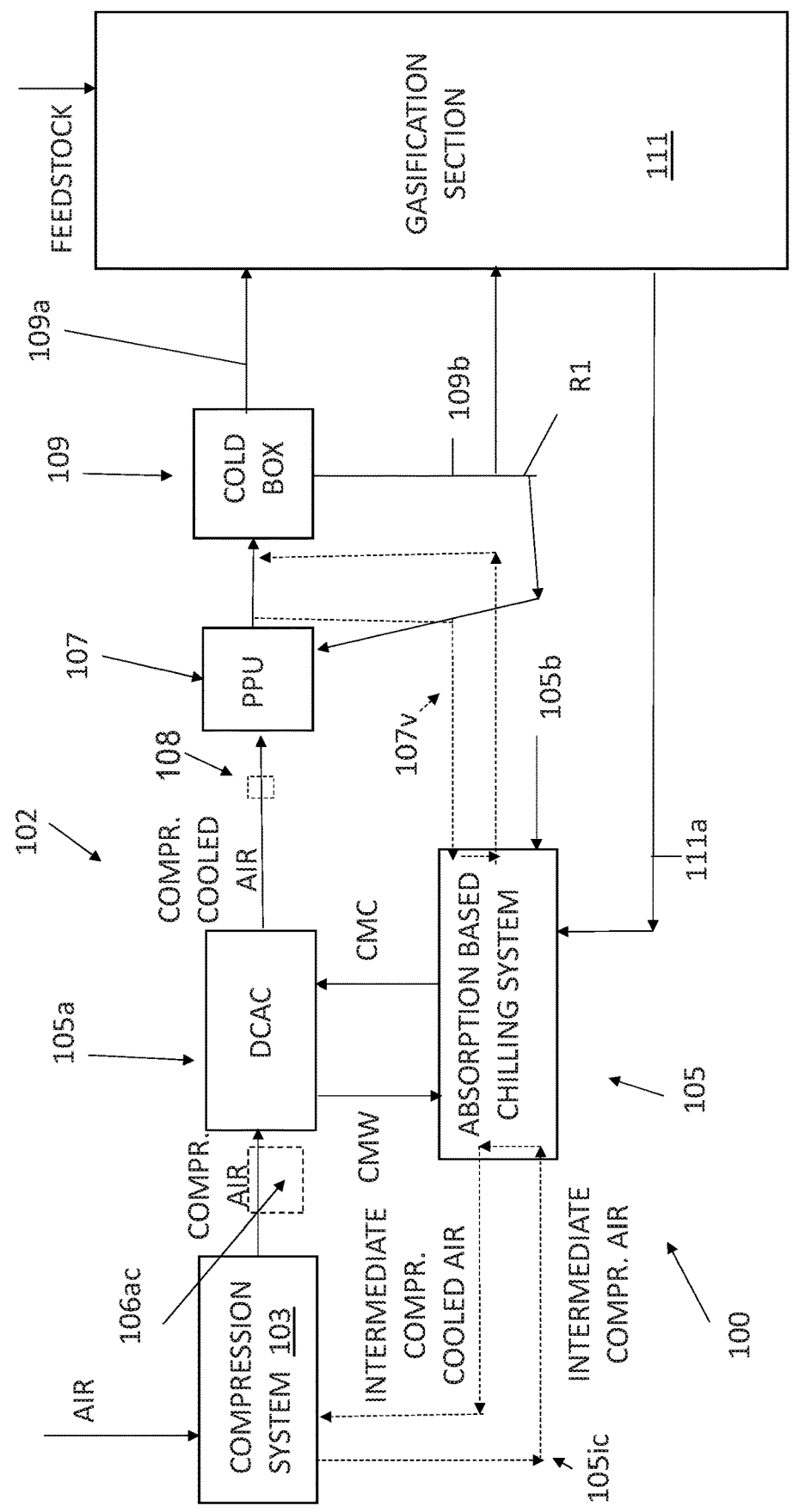
FIG. 2 is a schematic block diagram of a second exemplary embodiment of a plant utilizing a second exemplary embodiment of the absorption based chilling system. An intermediate compressor air cooling conduit arrangement 105ic, a knockout drum 108, and an arrangement of conduits for a purified cooling stream flow 107v that can be utilized in this embodiment is shown in broken line in FIG. 2.
Figure 3:
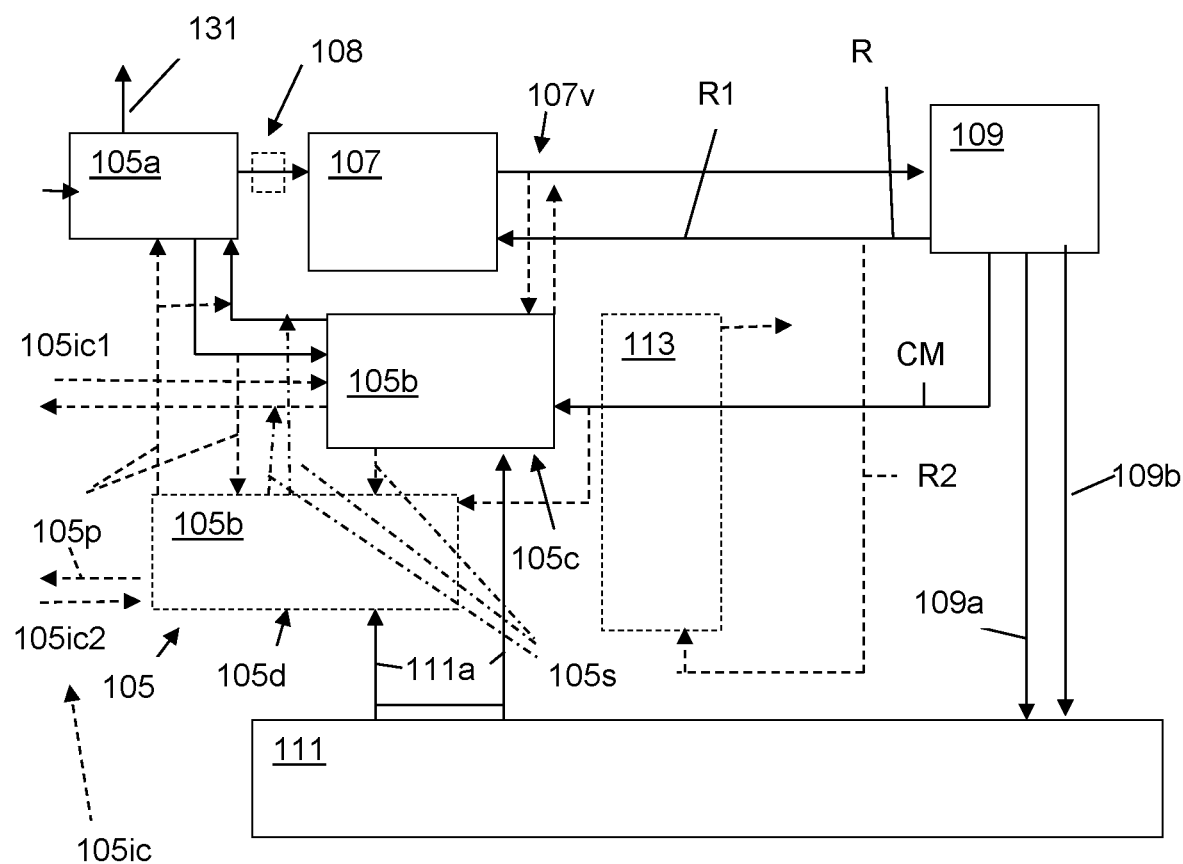
FIG. 3 is a fragmentary schematic block diagram of the second exemplary embodiment of the plant that provides a more detailed illustration of an exemplary fluid flow for fluid passing to and from the exemplary absorption based chilling system.

The absorption based chilling system 105 can also be positioned and configured to facilitate cooling of the compressed air (COMPR. AIR) from the compression system 103 by chilling a cooling medium to be fed to a direct contact cooler 105a or other type of heat exchanger of the absorption based chilling system 105 for cooling of the compressed air before the cooled compressed air (COMPR. COOLED AIR) is fed to the PPU 107. FIGS. 2-3 may best illustrate an exemplary embodiment of this type of arrangement.

For embodiments that utilize a direct contact cooler 105a, the direct contact cooler 105a can be a heat exchanger in which a cooling medium (e.g. liquid water) that is fed into the body of the cooler to directly contact the compressed air passed through the body of the heat exchanger to cool that compressed air. The heated cooling medium (heated via its direct contact with the hotter compressed air) can be output from the direct contact cooler 105a after it is used to cool the compressed air for being output to another plant unit for storage and/or reuse (e.g. the heated cooling medium output from the direct contact cooler 105a can be sent back to the cooling tower 113 and/or absorption chiller 105 as part of a recycle circuit for being re-cooled for being recycled back to the direct contact cooler at the inlet for the cooling medium).

In some embodiments, the direct contact cooler 105a can be integrated into a compression system aftercooler unit such that a bottom section of this cooling unit cools the compressed air (COMP. AIR) output from the compression system via a first cooling medium (e.g. cooling water that may be at ambient temperature or other temperature) via a shell and tube type heat exchanger arrangement or other type of heat exchanger arrangement (e.g. a direct contact heat exchange arrangement, etc.) and the upper section of the unit is the direct contact cooler 105a that is configured to further cool the compressed air via a second cooling medium, such as chilled water (e.g. water chilled to a temperature below ambient temperature). The second cooling medium fed to the direct contact cooler can be chilled to a direct contact cooler chilling medium inlet temperature by one or more absorption chillers 105b of the chilling system 105.

Referring to the exemplary arrangement of FIGS. 1 and 4-7, the compressed air from the compression system 103 can be fed directly to the primary absorption chiller 105c via a primary chiller conduit. The absorption chiller 105b can cool the compressed air to a pre-selected compressed air feed temperature before the compressed air is directed to the PPU 107 for purification via an absorption chiller connection conduit connecting the output of the absorption chiller 105b to the PPU 107.

For embodiments that utilize a secondary absorption chiller 105d (shown in broken line in FIG. 4), the secondary absorption chiller 105b can be positioned and arranged to receive cooled compressed air from the primary chiller 105c in an in-series arrangement. The secondary chiller 105d can then further cool that air received from the primary chiller 105c to the pre-selected compressed air feed temperature. The cooled compressed air from the secondary chiller 105d can then be fed to the PPU 107 via at least one secondary chiller conduit arrangement 105s (shown in chain line in FIG. 4).

Alternatively, the secondary absorption chiller 105b can be positioned and arranged to receive a portion of the compressed air (COMPR. AIR) directly from the compression system via a secondary chiller conduit arrangement 105p that can provide a second portion of the compressed air as an inlet flow of compressed air to the secondary absorption chiller 105d while a first portion of this compressed air (COMPR. AIR) is fed to the primary absorption chiller 105c via a primary compressed air inlet conduit connecting the primary absorption chiller 105c to the compression system 103. Cooled compressed air (COMPR. COOLED AIR) from the primary chiller 105c can be output from the primary absorption chiller 105c via an outlet conduit of the primary absorption chiller 105c with the cooled first portion of the compressed air at the pre-selected compressed air feed temperature (or within the pre-selected compressed air feed temperature range). Cooled compressed air (COMPR. COOLED AIR) from the secondary chiller 105d can be output from the secondary absorption chiller 105d via an outlet conduit of a secondary chiller conduit arrangement 105p that connects the output of the secondary absorption chiller with the output of the primary absorption chiller 105c. The output of the secondary absorption chiller 105d can provide the cooled second portion of the compressed air at the pre-selected compressed air feed temperature (or within the pre-selected compressed air feed temperature range) output from the secondary absorption chiller 105d for being mixed or merged with the output flow from the primary absorption chiller 105c before the flow of cooled compressed air is fed to the PPU 107 for purification.

Other embodiments of the plant can utilize a different configuration for the absorption based chilling system 105. For example, referring to the exemplary arrangement of FIGS. 2 and 3, the compressed air from the compression system 103 can be fed directly to a direct contact cooler 105a of the absorption based chilling system 105. The cooling fluid of the direct contact cooler 105a can be liquid water, water vapor, glycol or other type of cooling fluid that can be directly contacted with the compressed air (COMPR. AIR) within a shell or other type of housing of the direct contact cooler 105a for cooling the compressed air for providing compressed cooled air (COMPR. COOLED AIR) to the PPU 107 for purification. In this type of arrangement, the at least one absorption chiller 105b of the absorption based chilling system can chill the cooling medium used by the direct contact cooler 105a for cooling the compressed air. For instance, the at least one absorption chiller 105b can include a primary absorption chiller 105c that has a cooling medium conduit connection between the primary chiller 105c and the direct contact chiller for feeding cooled cooling medium (e.g. liquid water) to the direct contact cooler 105a. The primary absorption chiller 105b can cool the direct contact cooler's cooling medium to a pre-selected cooling medium inlet temperature (which can also be referred to as a pre-selected chilling medium inlet temperature) before the cooling medium is contacted with the compressed air for cooling the air. The primary absorption chiller 105c can receive the cooling medium to be cooled via a cooling medium conduit CM that connects the absorption chiller 105b to a cooling medium feed. The cooling medium feed can be chilled water output from an element of the cold box 109, glycol output form an element of the cold box 109, or other type of cooling medium feed element (e.g. a flow of water or other fluid to be further cooled via at least one absorption chiller 105b that the chiller receives from the gasification section 111 or cold box 109 via a cooling medium conduit arrangement).

For embodiments that utilize a secondary absorption chiller 105*d* (shown in broken line in FIG. 3), a secondary absorption chiller 105*b* can be positioned and arranged to receive cooling medium from the primary chiller 105*c* in an in-series arrangement. The secondary chiller 105*d* can then further cool that cooling medium received from the primary chiller 105*c* to the pre-selected cooling medium inlet temperature. The cooled cooling medium from the secondary chiller 105*d* can then be fed to the direct contact cooler 105*a* via at least one secondary chiller conduit arrangement 105*s* (shown in chain line in FIG. 3) that connects the secondary chiller 105*d* to the direct contact cooler 105*a*.

Alternatively, the secondary absorption chiller 105*b* can be positioned and arranged to receive a portion of the cooling medium CM via a chiller cooling medium feed conduit (illustrated in broken line in FIG. 3) that can provide a second portion of the cooling medium to be cooled to the secondary chiller 105*d* while a first portion of the cooling medium to be cooled is fed to the primary chiller 105*c*. The first portion of the cooling medium can be output from the primary absorption chiller 105*c* via an outlet conduit of the primary absorption chiller with the cooled first portion of the cooling medium at the pre-selected cooling medium inlet temperature (or within the pre-selected cooling medium inlet temperature range). Cooled cooling medium from the secondary chiller 105*d* can be output from the secondary absorption chiller 105*d* via an outlet conduit of a secondary chiller conduit arrangement 105*p* that connects the output of the secondary absorption chiller with the output of the primary absorption chiller 105*c* for feeding the chilled cooling medium to the direct contact cooler 105*a*. The output of the secondary absorption chiller 105*d* can provide the cooled second portion of the cooling medium at the pre-selected cooling medium inlet temperature (or within the pre-selected cooling medium inlet temperature range) output from the secondary absorption chiller 105*d* for being mixed or merged with the output flow form the primary absorption chiller 105*c* before the flow of cooled cooling medium is fed to the direct contact cooler 105*a*. In yet other embodiments, at least a portion of the cooling medium output from the secondary chiller 105*d* can be fed to the direct contact cooler for being a second cooling medium feed to the direct contact cooler 105*a* instead of that portion being merged with the cooling medium from the primary chiller 105*c* before the cooling medium is fed to the direct contact cooler 105*c*.

In yet other embodiments, there may not be any merging of cooling medium from the primary and secondary chillers. Instead, each chiller may operate in parallel and feed cooling medium output from that chiller to the direct contact cooler 105*a* via respective cooling medium feed conduits connecting the different chillers to the direct contact cooler 105*a*. For such an embodiment, the temperature of the cooling medium output form each chiller may be the same or may differ (e.g. the cooling medium inlet temperature fed to the direct contact cooler may differ for the different portions of cooling medium fed to the direct contact cooler via the different absorption chillers 105*b* or may be the same temperature or within the same temperature range).

It should be understood that embodiments of the absorption based chilling system 105 can utilize multiple chillers 105*b* so that the secondary chiller 105*d* can be utilized in the event an expected impurity spike that may occasionally be anticipated to occur in connection with operation of the plant 100. For instance, a CO2 spike or other type of impurity spike can be significantly larger than that designed for normal operation conditions of the plant 100. In some preferred embodiments, the absorption based chilling system 105 can be arranged so that during normal operation (e.g. no CO2 spike or other impurity spike), only the primary chiller 105*c* is used and the secondary chiller 105*d* is off-line and remains as a spare. In response to detection of an impurity spike in the feed (e.g. a CO2 spike in which CO2 concentration of the air is above a pre-selected feed threshold, etc.), the secondary chiller 105(*d*) can be started to work in addition to the primary chiller 105*c*. Further, under normal operation (no impurity spike), if the primary chiller 105*c* fails or needs maintenance, the secondary chiller 105*d* can be started immediately to be operated in place of the primary chiller 105*c*. As discussed herein, a controller can be utilized in conjunction with sensors of the plant and other control elements (e.g. conduits, valves, etc.) to facilitate operation of the absorption based chilling system in response to detection of such concentration changes or other type of process parameters.

In some embodiments, the cooling medium used for the absorption chillers 105*b* for chilling at least one process stream (e.g. compressed air or the cooling medium to be used by the direct contact cooler 105*a*) can be chilled water or air. For embodiments in which the cooling medium that is to be fed to the direct contact cooler 105*a* is water, a portion of the cold nitrogen stream from the cold box 109 can be used to cool the water in a cooling tower 113 before it is further cooled by the one or more absorption chillers 105*b*. In some embodiments, the cooling tower 113 can be considered a waste tower.

For such embodiments, each absorption chiller 105*b* can be located between the cooling tower 113 and the direct contact cooler 105*a* for cooling the chilled water a desired direct contact cooler cooling medium inlet temperature within a pre-selected inlet temperature range before it is fed to the direct contact cooler 105*a*. This chilled water then cools the compressed air in the direct contact cooler prior to the compressed air being sent to the PPU 107. The direct contact cooler 105*a* and the cooling tower 113 can be sized accordingly to handle the colder temperature of the chilled water. It can also add a layer of separation between the air and the absorption chiller refrigerant used for chilling of the compressed air. This arrangement can also allow the absorption chiller(s) 105*b* to be sized smaller since it is cooling water and not air in this type of arrangement. Contact and distribution issues can also be well addressed in this type of arrangement and at high efficiency by use of packing or trays. One potential drawback of this arrangement is that it can add an additional approach temperature (e.g. 2°-3° C.) and may, in some plants, also add to the capital costs associated with implementation of the absorption based chilling system 105.

The absorption based chilling system 105 can also be positioned and arranged to provide cooling for the purified compressed air output from the PPU 107 before that flow of purified air is fed to the cold box 109. For example, at least one pre-purification cooling conduit arrangement can be positioned and arranged for connecting the PPU 107 to the absorption based chilling system 105 for cooling the purified air after it is output from the PPU 107 and before it is fed to the cold box 109. This purified cooling stream flow 107*v* provided via the pre-purification cooling conduit arrangement can provide cooled purified fluid to the cold box 109 to help provide a more efficient cold box operation of the purified air output from the PPU 107

Embodiments of the absorption based chilling system 105 used in embodiments of the plant 100 can be configured to utilize a cooling medium (which can also be referred to as a chilling medium) that is output from the cold box 109. The cooling medium may be used as a cooling fluid in the cooling tower 113 or other type of heat exchanger. For example, a flow of nitrogen output from the cold box 109 can be output as a regeneration fluid flow R. As may best be seen from FIG. 5, a first portion R1 of this regeneration fluid flow R can be fed to a regeneration fluid heater 107*htr* for use in heating the regeneration fluid before the regeneration fluid is passed the PPU 107 for being passed through a first adsorber 107*a* of the PPU that is in an off-state position for regenerating adsorbent material within the first adsorber 107*a* while a second adsorber 107*b* of the PPU 107 is in an on-line position for receiving and purifying cooled compressed air fed to the PPU 107. A heat exchanger (not shown) can be utilized to have the regeneration stream heated to a desired temperature before it is fed to the off-line adsorber of the PPU 107 for regeneration of the adsorbent material as well. After the regeneration fluid is passed through the one or more off-line adsorbers of the PPU 107, the regeneration gas can be routed to another process unit 115 of the plant (e.g. a heat exchanger, a column, etc.) for further processing via a regeneration gas output conduit arrangement extending between the adsorbers of the PPU 107 and the process unit 115.

It should be appreciated that the PPU 107 can be configured so that the on-line adsorber and off-line adsorber can be switched from the first adsorber 107*a* to the second adsorber 107*b* and vice versa. The first portion R1 of the regeneration fluid R can be fed via a regeneration fluid conduit so that the first portion R1 of regeneration fluid is fed to the adsorber that is in the off-line position while the other adsorber is in the on-line position for purifying the cooled compressed air. Some embodiments of the PPU 107 can utilize multiple pairs of off-line and on-line switchable adsorbers that work in parallel or in series for purification of the cooled compressed air after that air is cooled via the absorption based chilling system 105.

The adsorbers 107*a* of the PPU 107 can be radial adsorbers in some embodiments. In other embodiments, the adsorbers can be axial flow adsorbers.

A second portion R2 of the regeneration fluid flow R can be fed to a cooling tower 113 or other type of heat exchanger for cooling the cooling medium fed to the at least one absorption chiller 105*b* before it is utilized to produce a product or otherwise further processed, or is emitted to the environment as a waste gas within a pre-selected waste temperature range (see broken line segments of FIGS. 3 and 4 illustrating an exemplary flow path for the second portion R2 of the regeneration fluid, for example). The cooling medium output from the cold box 109 can be fed to the cooling tower 113 so the cooling medium is passed through the tower to be cooled via a cooling medium conduit arrangement CM. After the cooling medium is passed through the cooling tower 113 or another type of heat exchanger, the cooling medium can be feed to one or more absorption chillers 105*b* for being the process gas for the chiller to cool (e.g. in the embodiment of FIGS. 2-3) before that cooled cooling medium is fed to the direct contact cooler 105*a* or the cooling medium can be fed to the one or more condensers 203 of the one or more absorption chillers 105*b* for being used as a cooling medium by the chiller for cooling the compressed air (COMPR. AIR) as the process stream to be cooled by the chiller, such as in the embodiment of FIGS. 1 and 4, for example.

Figure 6:
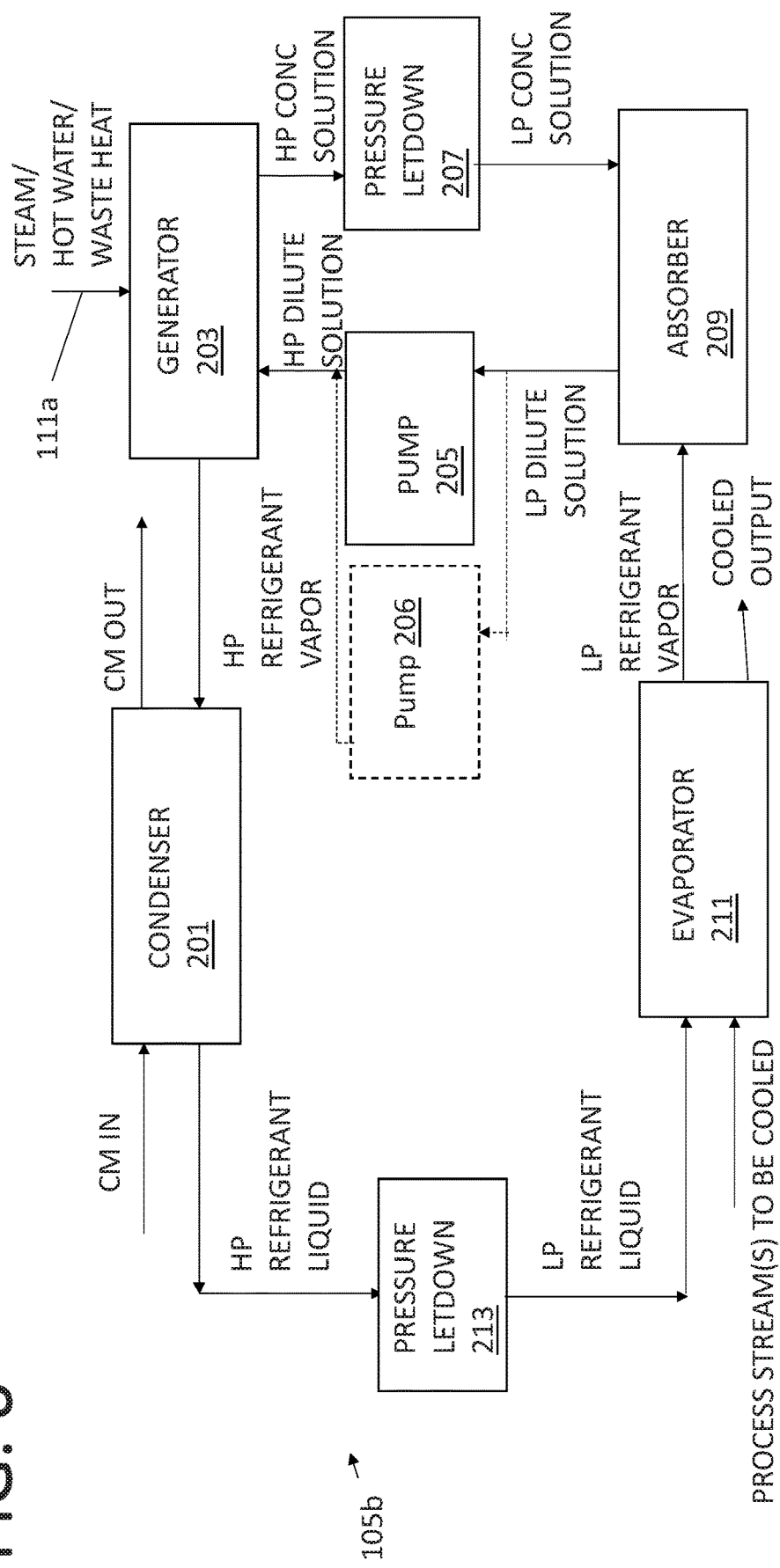
FIG. 6 is a schematic block diagram of an exemplary embodiment of an absorption chiller 105b that can be utilized in embodiments of the exemplary absorption based chilling system 105 that can be included in the first and second exemplary embodiments of the plant.
Figure 7:
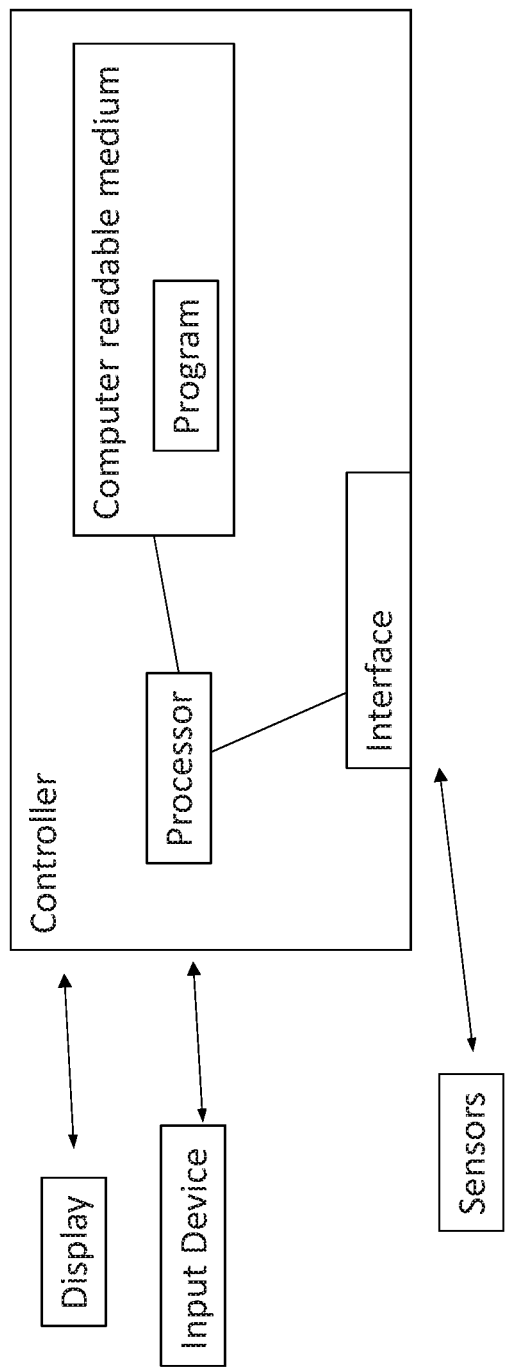
FIG. 7 is a block diagram of an exemplary controller that can be utilized in the exemplary embodiments of the exemplary absorption based chilling systems that can be included in the first and second exemplary embodiments of the plant.

Exemplary designs for an absorption chiller 105*b* that can be used as a primary chiller 105*c* and also a secondary chiller 105*d* may best be appreciated from the exemplary embodiment shown in FIG. 6. It should be appreciated that other types of absorption chillers can also be utilized (e.g. multi-stage absorption chillers, other types of single stage absorption chillers, etc.). Referring to FIG. 6, the absorption chiller 105*b* can include a condenser 201, a generator 203, a first pump 205, a first pressure letdown 207 (e.g. a pressure letdown valve), an absorber 209, an evaporator 211, and a second pressure letdown 213 e.g. a pressure letdown valve). Embodiments can also utilize a second pump 206 (shown in broken line in FIG. 6) that can operate in parallel with the first pump or be provided as a secondary pump that can come on-line whenever the first pump goes off line due to a malfunction, error, or maintenance.

As may be appreciated from the exemplary embodiment of FIG. 6, the absorption chiller 105*b* can be configured so that at least one gasification stream 111*a* is fed from the gasification section to the generator 203 of the chiller. The gasification stream can be, for example, a low pressure steam (e.g. steam that is at 8-10 bar pressure, or steam that is at or below 10 bar, steam that is at 800 kPa to 1,000 kPa or is at or below 1,000 kPa, etc.), or can be hot liquid water (e.g. water that is heated but in a liquid state), or may be another flow of fluid from the gasification section that may be a waste flow of fluid from the gasification section (e.g. heated gas from the gasifier, etc.). In yet other embodiments, the gasification stream 111*a* fed to the generator 203 of the absorption chiller 105*b* can be intermediate pressure steam or high pressure steam from the gasification section 111.

The absorption chiller 105*b* can be positioned so that the generator 203 outputs a high pressure refrigerant vapor (HP REFRIGERANT VAPOR) to the condenser to condense a condenser medium inlet fluid (CM IN) fed to the condenser 201 for condensing the refrigerant. The refrigerant may be water, glycol, or other suitable refrigerant. The condenser medium can be water, ambient air, or other type of fluid flow for condensing the refrigerant vapor. The condensed condenser medium can be output from the condenser (CM OUT) for being sent to another plant unit (e.g. a wash tower or a water reservoir if the cooling medium is water, etc.) The high pressure refrigerant vapor may be condensed into a liquid when passed through the condenser 201 and output as a high pressure refrigerant liquid (HP REFRIGERANT LIQUID) that can then be fed to a second pressure letdown 213 for lowering the pressure of the refrigerant so it is a low pressure refrigerant liquid (LP REFRIGERANT LIQUID) that can be fed to the evaporator 211. The low pressure refrigerant may be vaporized in the evaporator as the refrigerant absorbs heat from the process stream(s) to be cooled by the chiller that is also passed through the evaporator 211 in co-current or countercurrent flow with the refrigerant passed through the evaporator 211. The at least one process stream that is cooled in the evaporator 211 (PROCESS STREAM (S) TO BE COOLED) can be the cooling medium to be cooled for feeding to the direct contact cooler 105*a* or can be the compressed air (COMPR. AIR), for example.

The low pressure refrigerant vapor output from the evaporator 211 (LP REFRIGERANT VAPOR) can be fed to the absorber 209. The absorber 209 an receive a low pressure concentrate solution (LP CONC SOLUTION) so that the low pressure refrigerant vapor absorbs this solution such that the absorber 209 can output a low pressure diluted solution (LP DILUTE SOLUTION) of the refrigerant for feeding to the first pump 205 or the second pump 206 for forming a high pressure dilute solution (HP DILUTE SOLUTION) for feeding to the generator 203.

The generator 203 can be configured to use the heat of at least one gasification stream 111*a* to form the high pressure refrigerant vapor from the high pressure dilute solution it receives via the pump. The generator 203 can also output a high pressure concentrated solution (HP CONC SOLUTION) for feeding to the first pressure letdown 207 so that the low pressure concentrate solution (LP CONC SOLUTION) can be fed to the absorber 209 as part of the refrigerant circuit of the chiller.

It should be appreciated that the evaporator 211 can be arranged and configured to cool multiple process streams if the chiller is a single stage chiller or that the chiller can be a multi stage chiller that can have multiple stages for cooling different process streams or for cooling the same process stream in series. The one or more process streams to be cooled in the evaporator 211 can then be output from the evaporator as one or more cooled output streams (COOLED OUTPUT) that are output from the chiller. For instance, in some embodiments, each chiller can be a multiple stage chiller that includes a first stage for cooling the intermediate compression system air, a second stage for cooling the compressed air stream or for cooling the cooling medium fed to the contact cooler for cooling the compressed air, as well as a third stage for cooling the purified air output from the PPU 107. As another example, each chiller can be a multiple stage chiller that includes a first stage for cooling the compressed air stream or for cooling the cooling medium fed to the contact cooler for cooling the compressed air, as well as a second stage for cooling the purified air output from the PPU 107. As yet another example, some embodiments of the absorption chiller 105 can be a multiple stage chiller that includes first and second stages for cooling the compressed air stream or for cooling the cooling medium fed to the contact cooler for cooling the compressed air to the desired temperature for feeding the compressed cooled air to the PPU 107. As yet another example, embodiments of the chiller can be configured so that the evaporator 211 of a single stage chiller receives more than one flow of process streams to be cooled in the evaporator 211 (e.g. the intermediate compression system compressed air, the compressed air output from the compression system and also the purified air output from the PPU 107 via the purified cooling stream flow 107v or the compressed air output from the compression system and also the purified air output from the PPU 107 via the purified cooling stream flow 107v, etc.).

The absorption chiller 105b can be designed so that the temperature difference across the chiller can meet a particular set of processing design criteria parameters (e.g. the difference in temperature between the inlet temperature of the process stream to be cooled and the outlet temperature of the process stream after it is cooled by the chiller). These parameters may be as desired based on the process conditions, such as ambient temperature of the feed air received at the compression system 103, the CO2 concentration of the feed, etc. In some embodiments, the temperature difference can be greater than 3° C., greater than 5° C., or between greater than 5° C. and 20° C. It should be understood that a temperature difference of 5° C.-10° C. would refer to the fact that the chiller's evaporator 211 may cool the process stream to be cooled by 5° C.-10° C. (e.g. the inlet temperature of the stream may be 10° C. and the outlet temperature may be 5° C., 3° C., 1° C., or 0° C., etc.).

In many embodiments, we believe that the temperature difference of between 5° C. and 20° C. can result in significant enough savings in operational capacity for sizing on the adsorbers of the PPU such that these cost savings on the adsorber sizing can ensure the inclusion of the adsorption based chilling system components provide an improvement in profit for operation of a plant. It is possible such savings may be realized at lower temperature differential operational parameters as well. We also believe that embodiments of the absorption chillers 105b of the absorption based chilling system 105 that can utilize a temperature differential of between 5° C. and 50° C. (e.g. input process stream going from 55° C. to 5° C. or from 55° C. to 45° C., etc.), can provide a greater amount of economic benefit for a high return on investment by taking greater advantage of the absorption chiller(s) 105b and utilizing a greater amount of heat source flow from the gasification section stream(s) 111a. For instance, in many plants we believe the compressed cooled air can be at 5° C.-20° C., 5° C.-15° C., or 5° C.-10° C., etc. At these temperatures for the compressed cooled air (COMPR. COOLED AIR), the adsorber sizing for the adsorbers of the PPU 107 can be minimized due to utilization of one or more absorption chillers 105b utilizing one or more gasification section streams 111a. For instance, a low pressure steam flow rate from the gasification section 111 may be between 0.5 tons/hr and 5 tons/hr and be utilized by the generator(s) of the absorption chiller(s) 105b for cooling the compressed air or the cooling medium for the direct contact cooler 105a used for cooling the compressed air.

In some embodiments, the compressed cooled air can be at a desired temperature within the range of 10° C.-15° C. But, when an impurity spike is detected in the air feed, the desired temperature range may be reduced further to a range of 5° C.-10° C. or other suitable impurity spike cooled compressed air temperature range. The temperature change for the cooled compressed air to account for an impurity spike can vary based on the size of the spike (e.g. how much higher CO2 or other impurity may be within the feed air being compressed, etc.) and the plant (e.g. available heat from at least one process steam from the gasification section 111 that can be output in at least one gasification section flow 111a that can be at a flowrate that may be increased by 0.2 to 2 t/h during the spike versus in the absence of the spike, etc).

For embodiments of the absorption chiller based system 105 that are configured to cool compressor inlet feed air and/or other intermediate compressed air streams and/or the purified air output from the PPU 107, this can increases the size of the absorption chiller(s) 105b of the system. But, this can also allow for compressor size reduction, compression efficiency improvements and may also reduce the overall power cost of the ASU.

As can be appreciated from FIGS. 1-5, embodiments of the plant and absorption based chilling system 105 can include use of a knockout drum 108 that can be positioned between the PPU 107 and the absorption based chilling system 105 (e.g. direct contact cooler 105a or absorption chiller 105b of the system). The knockout drum 108 can be positioned to remove water and hydrocarbons from the cooled compressed air output from the absorption based chilling system 105 before that air is fed to the PPU 107 for purification. The knockout drum 108 can be positioned to remove water and/or hydrocarbons so that the PPU 107 does not have to remove these impurities. This can allow adsorbers of the PPU 107 to be sized smaller and also use less layers (e.g. be more simply designed and also be a smaller size) for purification of the compressed air before it is fed to the cold box 109.

In some preferred embodiments, the regeneration gas fed to the PPU 107 can be heated by the same heat source used for feeding the generator 203 of the absorption chiller. A gasification stream 111a that can be used for heating the regeneration gas can be split so some of this stream is used in a heat exchanger to heat the regeneration gas in a regeneration fluid heater 107htr while another portion of this stream is fed to the absorption chiller generator(s), thereby reducing piping cost and complexity. In another embodiment, multiple heat sources via multiple different gasification section streams 111a may be used in series or parallel in one or more absorption chillers as well as providing heat for heating the regeneration gas fed to the PPU 107.

In some embodiments, the absorption based chilling system 105 can be arranged to allow for the elimination of the alumina layer within the adsorbers of the PPU 107. Such embodiments can allow a middle screen layer of the adsorbers to be eliminated, which can reduce capital cost and fabrication and operation complexity associated with the PPU 107.

Embodiments of our absorption based chilling system 105 are not limited by any chiller sparing methodologies. For instance, 1×100%, 2×100%, 2×50%, absorption chillers may be installed, or available. In some cases, a mechanical chiller may be installed as a spare for the absorption chiller(s) 105(b). As another example, any solute may be used in the absorption chiller 105b, such as lithium bromide (LiBr) or ammonia (NH3). Any additional components may be added to the solution, such as corrosion inhibitors, or salts to prevent crystallization. When water is used as the chilling medium or as the cooling medium fed to the condenser 201, the water chilled may be sea water in some implementations close to a source of salt water (e.g. an ocean). The material of construction of heat exchangers may be carbon steel, stainless steel, or tungsten and other materials needed if seawater exchangers are needed or used. Any type of heat exchangers for the absorber chillers 105b may be used, such as shell and tube, plate and fin, kettle type, etc. Any number of stages may be used in the cooling as well (e.g. a single state, two stages, more than two stages, etc.).

We have found that a significant difference between a mechanical chiller and an absorption chiller 105b is that instead of using a compressor to increase the pressure of a low pressure refrigerant vapor and close the refrigerant circuit, the pressure increase can be done through use of multiple heat exchangers (e.g. evaporator 211 and condenser 201), a pump and at least one pressure letdown (e.g. a pressure letdown valve). This can involve more equipment as compared to a mechanical chiller. But, the absence of rotating equipment can allow for use of a lower level of electrical power consumption during operations. This operational cost improvement can provide a significant advantage over mechanical chillers. Below are a few illustrative examples to help make some of the significant operational advantages we have determined to exist by implementation of an embodiment of our absorption based chilling system 105 more readily apparent.

For instance (and as a non-limiting example), in a plant designed to have a feed air flow of 500,000 nm3/hr at 15° C. with the direct contact cooler 105a and a cooling tower 113 (structured as a water tower) and having 2.5 ton/hr LP steam at 8 bar (800 kPa) available as a gasification stream 111a, the feed to PPU 107 can be chilled to 7° C. under summer conditions with CO2 concentration of 800 ppm when at least one absorption chiller 105b of an absorption based chilling system is utilized in the plant as compared to non-use of a chiller. We have found that the utilization of the at least one absorption chiller 105b can reduce the adsorber size requirement for a PPU 107 by 30% for such a plant as compared to the case without a chiller and the amount of regeneration gas required to regenerate the offline adsorber of the PPU 107 can be halved. The chilled temperature of the feed gas can be chilled to a temperature that is about 30% lower and the impurity spike from CO2 that the system can handle can be increased by 60% due to utilization of at least one absorption chiller 105b. This non-limiting example helps show the significant operational improvements that can be provided by exemplary embodiments of our absorption based chilling system 105.

As yet another non-limiting example, in an embodiment of a plant in which feed air flow is designed for 500,000 nm3/hr at 17° C. with a direct contact cooler 105a and a cooling tower 113 (structured as a water tower), and with 4 ton/hr LP steam at 8 bar (800 kPa) available as a gasification stream 111a, the feed to the PPU 107 can be chilled to 5° C. under summer conditions and account for a CO2 concentration spike of 800 ppm by implementation of an embodiment of our absorption based chilling system 105 via at least one absorption chiller 105b. The adsorber size for the PPU 107 can be reduced by 30% compared to the case without the chiller and the regeneration gas requirement can be halved as well. Moreover, the temperature of the air fed to the PPU can be reduced by over 58% and accommodate an impurity concentration spike that is 60% greater due to the use of the absorption chiller(s) 105(b). This non-limiting example helps further show the significant operational improvements that can be provided by exemplary embodiments of our absorption based chilling system 105.

Embodiments of the plant 100 and the absorption based chilling system 105 can utilize a controller to monitor and control operations of the plant 100 and/or absorption based chilling system 105. For instance, temperature sensors, pressure sensors, flow sensors, and concentration sensors configured to detect a concentration of one or more compounds (e.g. oxygen, CO2, N2, CO, water, etc.) can be included for sensing and/or detecting flow rates, concentrations, temperatures or pressures of fluid flowing through different elements or units of the plant and/or conduits between those units. For example, there can be sensors positioned to detect (i) the air flow rate, pressure, temperature and feed concentrations for the air fed to the compression system 103, (ii) flow rate, pressure, temperature and/or feed concentrations of the air output from the compression system 103 for feeding to the absorption based chilling system, (iii) flow rate, pressure, temperature and feed concentrations of the air output from the absorption based chilling system 105 for feeding to the PPU 107, (iv) the flow rate, pressure, temperature and constituent concentrations of the air output from the PPU 107 for feeding to the cold box, and/or (v) the flow rate, pressure, temperature and constituent concentrations of the air fed to the knockout drum 108 and/or output from the knockout drum 108. There can also be other sensors positioned in the compression system 103, absorption based chilling system 105, PPU 107, knockout drum 108, cold box 109, and/or gasification section 111 to monitor and control the operations of these elements of the plant 100. A controller can be provided to receive data from these sensor and adjust operations of different elements based on the received sensor data. An example of such a controller can be seen in FIG. 7, and can include a processor connected to a non-transitory computer readable medium and at least one interface for communications with the sensors. The processor can run at least one automated control program stored in the computer readable medium (e.g. non-transitory memory, flash memory, etc.) that defines a method for controlling the operation of the plant and/or one or more elements of the plant (e.g. the absorption based chilling system 105). In some embodiments, the controller can be configured so that one or more feed impurity concentrations from the air fed to the compression system 103 or output from the compression system 103 is monitored. When the one or more impurity concentrations exceeds a pre-selected threshold value (e.g. meets or exceeds an impurity concentration threshold value), the controller can actuate one or more valves so that the primary absorption chiller 105*c* operates at an increased operational capacity or so that the secondary absorption chiller 105*d* is brought on-line and begins to receive one or more process streams to be cooled as discussed herein (e.g. intermediate air from the compressor, compressed air output from the compression system 103, and/or purified air output from the PPU 107, etc.). The controller can also communicate with one or more control elements of the gasification section 111 so that an increased flow rate of one or more gasification streams 111*a* that can provide a heat source to the one or more absorption chillers 105*b* of the absorption based chilling system is obtained so that the chillers can account for the higher impurity concentration in their operation by cooling the compressed air to a pre-selected impurity spike temperature threshold that may be lower than the temperature setpoint used during a normal operational condition when the impurity spike is not present. In response to detection of the impurity concentration falling below the threshold, the controller can communicate with control elements of the different plant elements for having the secondary chiller 105*d* brought off-line and/or having the primary chiller operate at a reduced operational capacity after the impurity spike situation is addressed. Such communications can also be made to the gasification section stream conduit elements for adjusting the flow rate of one or more gasification streams 111*a* that feed fluid to the generator(s) of the one or more chillers 105*b*. The pre-selected impurity concentration threshold can be a suitable value selected to account for plant configuration and operation design criteria. In some embodiments, the pre-selected impurity concentration threshold can be 400 ppm $CO_2$, 500 ppm $CO_2$, 800 ppm $CO_2$, 1,000 ppm $CO_2$, 1,500 ppm $CO_2$, 2,000 ppm $CO_2$, 2,500 ppm $CO_2$, 3,000 ppm $CO_2$, 400 ppm $CO_2$ and also 50 ppm CO, or some other suitable threshold value criteria.

It should be appreciated that embodiments of the controller can also be configured to utilize other sensor data to actuate different plant operations and use of different conduits for different flow paths of fluid to and from different elements. In some embodiments, the controller can be connected to a display, and at least one input device and/or input/output device to facilitate output of data to a user or operator and receipt of input from an operator. For instance, the controller can be connectable to an operator work station or a computer of an operator of the plant. The controller can also be connected to other plant control elements for incorporation into a larger automated process control system for the plant.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. As another example, the flow rate, pressure, and temperature of the fluid passed through one or more chillers as well as passed through other plant elements can vary to account for different plant design configurations and other design criteria. As yet another example, the number of chillers and how they are arranged can be adjusted to meet a particular set of design criteria. As yet another example, the material composition for the different structural components of the chiller, chiller adsorption system, and plant can be any type of suitable materials as may be needed to meet a particular set of design criterial. As yet another example, in some embodiments it is contemplated that the chilling system 105 can utilize one or more mechanical chillers instead of absorption chillers 105*b*.

It should be appreciated that embodiments of the plant can be configured as an air separation plant or other type of plant in which at least one chiller can be utilized. The plant. chiller adsorption system, and the one or more chillers can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the chiller, chiller adsorption system, air separation units, plants and methods of making and using the same have been shown and described above, it is to be distinctly understood that the invention is not limited thereto but may be otherwise variously embodied and practiced within the scope of the following claims.

What is claimed is:

1. An absorption based chilling system for an air separation unit (ASU) of a plant, the absorption based chilling system comprising:
    at least one absorption chiller positioned to receive at least one process stream from a gasification section of the plant so heat from the at least one process stream is fed to at least one generator of the at least one absorption chiller, the at least one absorption chiller being positionable to:
        (i) cool air at a first pressure from a compression system of the ASU for feeding the cooled air to a pre-purification unit (PPU) for purification of the air to form a purified air flow for feeding the purified air flow to a cold box of the ASU,
        (ii) cool the purified air flow from the PPU before the purified air flow is fed to the cold box, and/or
        (iii) the cool air at a second pressure from the compression system of the ASU for feeding the cooled air at the second pressure to the compression system to undergo further compression to the first pressure, the first pressure being higher than the second pressure;
    wherein the absorption based chilling system comprises one or more sensors and wherein the one or more sensors is configured to detect an impurity concentration of the air and the at least one absorption chiller includes a primary absorption chiller and a secondary absorption chiller, and wherein one of:
        the absorption based chilling system is configured so that a first portion of the air at the first pressure from the compression system is fed to the primary absorption chiller for chilling and a second portion of the air at the first pressure from the compression system is fed to the secondary absorption chiller for chilling in response to the impurity concentration being at or above a pre-selected threshold, and the absorption based chilling system is configured so that (i) a first portion of a cooling medium to be fed to a direct contact cooler for cooling the air at the first pressure from the compression system, is fed to the primary absorption chiller, the primary absorption chiller to cool the first portion of the cooling medium to a pre-selected direct contact cooler chilling medium inlet temperature and (ii) a second portion of the cooling medium to be fed to the direct contact cooler for cooling the air at the first pressure, is fed to the secondary absorption chiller, the secondary absorption chiller to cool the second portion of the cooling medium to the pre-selected direct contact cooler chilling medium inlet temperature in response to the impurity concentration being at or above the pre-selected threshold.

2. The absorption based chilling system of claim 1, wherein the at least one absorption chiller is positionable to:
(i) cool the air at the first pressure from the compression system of the ASU for feeding the cooled air to the PPU for purification of the air to form the purified air flow for feeding the purified air flow to the cold box of the ASU,
(ii) cool the purified air flow from the PPU before the purified air flow is fed to the cold box, and
(iii) cool the air at the second pressure from the compression system of the ASU for feeding the cooled air at the second pressure to the compression system to undergo further compression to the first pressure.

3. The absorption based chilling system of claim 1, wherein the at least one absorption chiller is positionable to:
(i) cool the air at the first pressure from the compression system of the ASU for feeding the cooled air to the PPU for purification of the air to form the purified air flow for feeding the purified air flow to the cold box of the ASU, and
(ii) cool the purified air flow from the PPU before the purified air flow is fed to the cold box.

4. The absorption based chilling system of claim 1, wherein the at least one absorption chiller is positionable to:
(i) cool the air at the first pressure from the compression system of the ASU for feeding the cooled air to the PPU for purification of the air to form the purified air flow for feeding the purified air flow to the cold box of the ASU, and
(iii) cool the air at the second pressure from the compression system of the ASU for feeding the cooled air at the second pressure to the compression system to undergo further compression to the first pressure.

5. The absorption based chilling system of claim 1, wherein the at least one absorption chiller is positionable to:
(ii) cool the purified air flow from the PPU before the purified air flow is fed to the cold box, and
(iii) cool of the air at the second pressure from the compression system of the ASU for feeding the cooled air at the second pressure to the compression system to undergo further compression to the first pressure.

6. The absorption based chilling system of claim 1, wherein at least one evaporator of the at least one absorption chiller cools the air at the first pressure received from the compression system of the ASU for feeding the cooled air to the PPU, cools the purified air flow from the PPU before the purified air flow is fed to the cold box, and/or cools the air at the second pressure from the compression system.

7. The absorption based chilling system of claim 1, wherein the direct contact cooler connected to the at least one absorption chiller to receive the cooling medium from the absorption chiller for cooling the air at the first pressure.

8. The absorption based chilling system of claim 7, wherein the cooling medium is comprised of water or glycol and the PPU includes at least one radial adsorber.

9. The absorption based chilling system of claim 8, wherein the cooling medium comprises water and the absorption based chilling system also comprises a cooling tower positioned between the cold box and the at least one absorption chiller to cool the cooling medium before the cooling medium is fed to the at last one absorption chiller, the cooling tower being positioned to receive a flow of cooling fluid from the cold box to cool the cooling medium before the cooling medium is fed to the at least one absorption chiller.

10. The absorption based chilling system of claim 1, wherein the PPU includes radial adsorbers.

11. A plant comprising:
an air separation unit (ASU) having the absorption based chilling system of claim 1; and
the gasification section.

12. The plant of claim 11, wherein the ASU has the compression system, the cold box, and the PPU and at least one knockout drum positioned between the absorption based chilling system and the cold box.

13. The plant of claim 11, wherein the at least one process stream from the gasification section of the plant also heats a heater for heating regeneration fluid feedable to at least one adsorber of the PPU in an off-state position during operation of the plant for heating a regeneration fluid passed through the at least one adsorber for regeneration of adsorbent material within the at least one adsorber.

14. A method of cooling air in an air separation unit (ASU) of a plant, the plant also having a gasification section, the method comprising:
positioning at least one absorption chiller in the ASU to receive at least one process stream from the gasification section so heat from the at least one process stream from the gasification section is feedable to at least one generator of the at least one absorption chiller;
providing cooling via the at least one absorption chiller to facilitate:
(i) cooling air at a first pressure from a compression system of the ASU for feeding the cooled air to a pre-purification unit (PPU) for purification of the air to form a purified air flow for feeding the purified air flow to a cold box of the ASU,
(ii) cooling the purified air flow from the PPU before the purified air flow is fed to the cold box, and/or
(iii) cooling the air at a second pressure from the compression system of the ASU for feeding the cooled air at the second pressure to the compression system to undergo further compression to the first pressure, the first pressure being higher than the second pressure;
wherein the at least one absorption chiller includes a primary absorption chiller and a secondary absorption chiller, the method also comprising:
one of:
in response to one or more sensors determining that an impurity concentration level is at or above a pre-selected threshold, adjusting operations of the at least one absorption chiller so that a first portion of the air at the first pressure from the compression system is fed to the primary absorption chiller and a second portion of the air at the first pressure from the compression system is fed to the secondary absorption chiller, and in response to one or more sensors determining that the impurity concentration level is at or above the pre-selected threshold, adjusting operations of the at least one absorption chiller so that (i) a first portion of a cooling medium to be fed to a direct contact cooler, the direct contact cooler for cooling the air at the first pressure from the compression system, is fed to the primary absorption chiller, the primary absorption chiller to cool the first portion of the cooling medium to a pre-selected direct contact cooler chilling medium inlet temperature and (ii) a second portion of the cooling medium to be fed to the direct contact cooler for cooling the air at the first pressure from the compression system, is fed to the secondary absorption chiller, the secondary absorption chiller to cool the second portion of the cooling medium to the pre-selected direct contact cooler chilling medium inlet temperature.

15. The method of claim 14, wherein the providing the cooling via the at least one absorption chiller includes:
   (i) the cooling of the air at the first pressure from the compression system of the ASU for feeding the cooled air to the PPU for purification of the air to form the purified air flow for feeding the purified air flow to the cold box of the ASU,
   (ii) the cooling of the purified air flow from the PPU before the purified air flow is fed to the cold box, and
   (iii) the cooling of the air at the second pressure from the compression system of the ASU for feeding the cooled air at the second pressure to the compression system to undergo further compression to the first pressure.

16. The method of claim 14, wherein the providing the cooling via the at least one absorption chiller includes:
   (i) the cooling of the air at the first pressure from the compression system of the ASU for feeding the cooled air to the PPU for purification of the air to form the purified air flow for feeding the purified air flow to the cold box of the ASU, and
   (ii) the cooling of the purified air flow from the PPU before the purified air flow is fed to the cold box.

17. The method of claim 14, wherein the providing the cooling via the at least one absorption chiller includes:
   (i) the cooling of the air at the first pressure from the compression system of the ASU for feeding the cooled air to the PPU for purification of the air to form the purified air flow for feeding the purified air flow to the cold box of the ASU, and
   (iii) the cooling of the air at the second pressure from the compression system of the ASU for feeding the cooled air at the second pressure to the compression system to undergo further compression to the first pressure.

18. The method of claim 14, wherein the providing the cooling via the at least one absorption chiller includes:
   (ii) the cooling of the purified air flow from the PPU before the purified air flow is fed to the cold box, and
   (iii) the cooling of the air at the second pressure from the compression system of the ASU for feeding the cooled air at the second pressure to the compression system to undergo further compression to the first pressure.

19. The method of claim 14, wherein at least one evaporator of the at least one absorption chiller cools the air at the first pressure received from the compression system of the ASU for feeding the cooled air to the PPU, cools the purified air flow from the PPU before the purified air flow is fed to the cold box, and/or cools the air at the second pressure from the compression system.

20. The method of claim 14, comprising:
   utilizing the at least one process stream from the gasification section to heat regeneration fluid to feed the heated regeneration fluid to an adsorber of the PPU that is in an off-state position for regeneration of adsorbent material within the adsorber of the PPU that is in the off-state position.

* * * * *